US011812464B2

(12) United States Patent
Chen et al.

(10) Patent No.: US 11,812,464 B2
(45) Date of Patent: Nov. 7, 2023

(54) PHYSICAL LAYER PREAMBLE AND SIGNALING FOR WIRELESS COMMUNICATION

(71) Applicant: QUALCOMM Incorporated, San Diego, CA (US)

(72) Inventors: Jialing Li Chen, San Diego, CA (US); Sameer Vermani, San Diego, CA (US); Lin Yang, San Diego, CA (US); Bin Tian, San Diego, CA (US); Vincent Knowles Jones, IV, Redwood City, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/149,123

(22) Filed: Jan. 2, 2023

(65) Prior Publication Data

US 2023/0156781 A1    May 18, 2023

Related U.S. Application Data

(63) Continuation of application No. 16/988,624, filed on Aug. 8, 2020, now Pat. No. 11,546,938.

(Continued)

(51) Int. Cl.
*H04L 69/18* (2022.01)
*H04W 74/00* (2009.01)
(Continued)

(52) U.S. Cl.
CPC ......... *H04W 74/004* (2013.01); *H04L 5/0053* (2013.01); *H04L 5/0094* (2013.01);
(Continued)

(58) Field of Classification Search
CPC ...... H04L 69/18; H04L 69/22; H04W 72/042; H04W 72/0453
See application file for complete search history.

(56) References Cited

U.S. PATENT DOCUMENTS

| 11,398,886 B2 | 7/2022 | Noh et al. |
| 2017/0064718 A1 | 3/2017 | Bharadwaj et al. |

(Continued)

FOREIGN PATENT DOCUMENTS

| EP | 3358776 A1 | 8/2018 |
| WO | WO2021030233 A1 | 2/2021 |
| WO | WO2021030234 A2 | 2/2021 |

OTHER PUBLICATIONS

Baik E (QUALCOMM): "TGah D1.0 LB200 Comment Resolutions on Section 24.3.8 S1G Preamble", IEEE Draft, 11-14-0108-01-00AH-LB200-PHY-CID-Resolutions-FOR-24-3-8, IEEE-SA Mentor, Piscataway, NJ USA, vol. 802, 11ah, No. 1, Jan. 20, 2014 (Jan. 20, 2014), pp. 1-41, XP068156337, Retrieved from the Internet: URL: https://mentor.ieee.org/802.11/dcn/14/11-14-0108-01-00ah-lb200-phy-cid-resolutions-for-24-3-8.docx >https://mentor.ieee.org/802.11/dcn/14/11-14-0108-01-00ah-lb200-phy-cid-resolutions-for-24-3-8.docx [retrieved on Jan. 20, 2014] Tables 24-14 Tables 24-15.

(Continued)

*Primary Examiner* — Samina F Choudhry
(74) *Attorney, Agent, or Firm* — Holland & Hart / Qualcomm

(57) ABSTRACT

This disclosure provides methods, devices and systems for wireless communication, and particularly, methods, devices and systems for including signaling regarding enhanced features of new wireless communication protocols. The signaling may be included in various portions of a physical layer preamble of a wireless transmission. In some implementations, the physical layer preamble may be used to indicate puncturing of subbands or content channels that (Continued)

may carry further signaling in accordance with preamble signaling designs of this disclosure. The physical layer preamble signaling be parallelized for different subchannels of a wireless channel that consists of multiple subchannels. Some implementations of the physical layer preambles may be used to multiplex different types of wireless local area network communications into different subsets of the plurality of subchannels of the wireless channel.

19 Claims, 19 Drawing Sheets

Related U.S. Application Data

(60) Provisional application No. 63/013,530, filed on Apr. 21, 2020, provisional application No. 63/003,812, filed on Apr. 1, 2020, provisional application No. 62/984,777, filed on Mar. 3, 2020, provisional application No. 62/978,297, filed on Feb. 18, 2020, provisional application No. 62/957,117, filed on Jan. 3, 2020, provisional application No. 62/926,406, filed on Oct. 25, 2019, provisional application No. 62/885,192, filed on Aug. 9, 2019.

(51) Int. Cl.
| | |
|---|---|
| *H04L 5/00* | (2006.01) |
| *H04W 72/0453* | (2023.01) |
| *H04W 72/0446* | (2023.01) |
| *H04L 69/22* | (2022.01) |
| *H04W 72/21* | (2023.01) |
| *H04W 72/23* | (2023.01) |
| *H04W 84/12* | (2009.01) |

(52) U.S. Cl.
CPC .............. *H04L 69/18* (2013.01); *H04L 69/22* (2013.01); *H04W 72/0446* (2013.01); *H04W 72/0453* (2013.01); *H04W 72/21* (2023.01); *H04W 72/23* (2023.01); *H04W 84/12* (2013.01)

(56) References Cited

U.S. PATENT DOCUMENTS

| | | | | |
|---|---|---|---|---|
| 2020/0136884 | A1* | 4/2020 | Park | H04L 27/2665 |
| 2020/0177425 | A1 | 6/2020 | Chen et al. | |
| 2020/0382998 | A1* | 12/2020 | Cao | H04L 1/0041 |
| 2021/0045117 | A1 | 2/2021 | Chen et al. | |
| 2021/0045151 | A1 | 2/2021 | Chen et al. | |
| 2021/0273838 | A1 | 9/2021 | Park et al. | |
| 2022/0124507 | A1 | 4/2022 | Ryu et al. | |
| 2022/0124693 | A1 | 4/2022 | Redlich et al. | |
| 2022/0140948 | A1 | 5/2022 | Kim et al. | |
| 2022/0140962 | A1 | 5/2022 | Park et al. | |
| 2022/0158773 | A1 | 5/2022 | Kim et al. | |
| 2022/0279562 | A1 | 9/2022 | Park et al. | |
| 2022/0322348 | A1 | 10/2022 | Park et al. | |
| 2022/0329471 | A1 | 10/2022 | Lim et al. | |
| 2023/0156780 | A1 | 5/2023 | Chen et al. | |

OTHER PUBLICATIONS

Chatzimisios P., et al., "Past, Present and Future of IEEE 802.11 Toward Wireless Gigabit Experience", Jan. 1, 2014 (Jan. 1, 2014), XP055679735, pp. 1-151, Retrieved from the Internet: URL: https://jesusalonsozarate.files.wordpress.com/2014/12/chatzimisios-iossifides-alonso-future-of-wifi-tutorial-globecom2014.pdf" >https://jesusalonsozarate.files.wordpress.com/2014/12/chatzimisios-iossifides-alonso-future-of-wifi-tutorial-globecom2014.pdf", p. 58.

International Preliminary Report on Patentability—PCT/US2020/045549 The International Bureau of WIPO—Geneva, Switzerland, dated Feb. 17, 2022.

International Preliminary Report on Patentability—PCT/US2020/045550 The International Bureau of WIPO—Geneva, Switzerland, dated Feb. 17, 2022.

International Search Report and Written Opinion—PCT/US2020/045549—ISA/EPO dated Feb. 3, 2021.

International Search Report and Written Opinion—PCT/US2020/045550—ISA/EPO—dated Mar. 31, 2021.

LAN/MAN Standards Committee of The IEEE Computer Society: "IEEE P802.11ax™/D4.3 Draft Standard for Information Technology—Telecommunications and Information Exchange between Systems Local and Metropolitan Area networks—Specific Requirements, Part 11: Wireless LAN Medium Access Control (MAC) and Physical Layer (PHY) Specifications, Amendment 1: Enhancements for High Efficiency WLAN", IEEE Draft, Draft P802.11 AX_D4.3, IEEE-SA., Piscataway, NJ USA, vol. 802.11 ax drafts, No. D4.3, Aug. 5, 2019 (Aug. 5, 2019), pp. 1-782, XP068152234, Retrieved from the Internet: URL:http://www.ieee802.org/11/private/Draft_Standards/11ax/Draft%20P802.11ax_D4.3.pdf >http://www.ieee802.org/11/private/Draft_Standards/11ax/Draft%20P802.11ax_D4.3.pdf [retrieved on Aug. 5, 2019] p. 549 p. 555 p. 584 Paragraph [27.3.6.6] Paragraph [27.3.10.7.2] Figures 27-8 Figures 27-9 Figures 27-10 Figures 27-11 Figures 27-26 Figures 27-29 Figures 27-30 Figures 27-31 Tables 27-18 Tables 27-20 Tables 27-21 Tables 27-24.

Lim D (LGE): "Discussion on the Preamble for 11be", IEEE Draft, 11-19-1142-00-00BE-Discussion-on-the-Preamble-for-11Be, IEEE-SA Mentor, Piscataway, NJ USA, vol. 802.11 EHT, 802.11be, Jul. 16, 2019 (Jul. 16, 2019), pp. 1-9, XP068153105, Retrieved from the Internet: URL:https://mentor.ieee.org/802.11/dcn/19/11-19-1142-00-00be-discussion-on-the-preamble-for-11be.pptx title="Link: https://mentor.ieee.org/802.11/dcn/19/11-19-1142-00-00be-discussion-on-the-preamble-for-11be.pptx">https://mentor.ieee.org/802.11/dcn/19/11-19-1142-00-00be-discussion-on-the-preamble-for-11be.pptx [retrieved on Jul. 16, 2019] p. 6.

Partial International Search Report—PCT/US2020/045550—ISA/EPO—dated Feb. 3, 2021.

Redlich O., et al., (Huawei): "Improved Preamble Puncturing in 802.11be", IEEE Draft, 11-19-1190-00-00BE-Improved-Preamble-Puncturing-in-802-11BE. IEEE-SA Mentor, Piscataway, NJ USA, vol. 802.11 EHT, 802.11be, Jul. 14, 2019 (Jul. 14, 2019), pp. 1-10, XP068152925, Retrieved from the Internet: URL: https://mentor.ieee.org/802.11 /dcn/19/11-19-1190-00-00be-improved-preamble-puncturing-in-802-11be.pptx >https://mentor.ieee.org/802.11/dcn/19/11-19-1190-00-00be-improved-preamble-puncturing-in-802-11be.pptx [retrieved on Jul. 14, 2019] p. 2-p. 5.

Stacey R (Intel)., et al., "Presentation on Proposed TGac Draft Amendment, 11-10-1376-00-00ac-Presentation-on-Proposed-Tgac-Draft-Amendment", IEEE Draft, 11-10-1376r0-00-00AC-Presentation-on-Proposed-Tgac-Draft-Amendment, IEEE-SA Mentor, Piscataway, NJ USA, vol. 802.11ac, Nov. 11, 2010 (Nov. 11, 2010), XP017675801, pp. 1-32, [retrieved on Nov. 11, 2010], p. 21.

Vermani S (Qualcomm): "Preamble Design Harmonization", IEEE Draft, 11-19-1021-01-00BE-Preamble-Design-Harmonization, IEEE-SA Mentor, Piscataway, NJ USA, vol. 802.11 EHT, 802, 11be, No. 1, Jun. 27, 2019 (Jun. 27, 2019), pp. 1-5, XP068151544, Retrieved from the Internet: URL:https://mentor.ieee.org/802.11/dcn/19/11-19-1021-01-00be-preamble-design-harmonization.pptx title="Link: https://mentor.ieee.org/802.11/dcn/19/11-19-1021-01-00be-preamble-design-harmonization.pptx" >https://mentor.ieee.org/802.11/dcn/19/11-19-1021-01-00be-preamble-design-harmonization.pptx [retrieved on Jun. 27, 2019] p. 2-p. 5.

Yang R (Interdigital): "Preamble Design Consideration for 802.11be", IEEE Draft, 11-19-1214-00-00BE-Preamble-Design-Consideration-for-802-11Be, IEEE-SA Mentor, Piscataway, NJ USA, vol. 802.11 EHT, 802.11be, Jul. 15, 2019 (Jul. 15, 2019), pp. 1-8, XP068153019, Retrieved from the Internet: URL:https://mentor.ieee.org/802.11/dcn/19/11-19-1214-00-00be-preamble-design-

(56) References Cited

OTHER PUBLICATIONS consideration-for-802-11be.pptx title="Link: https://mentor.ieee.org/802.11/dcn/19/11-19-1214-00-00be-preamble-design-consideration-for-802-11be.pptx" >https://mentor.ieee.org/802.11/dcn/19/11-19-1214-00-00be-preamble-design-consideration-for-802-11be.pptx [retrieved on Jul. 15, 2019] p. 2.
Yusuke A: "Advanced Progress in IEEE 802.11 WLAN Standardization", 2014 Asia-Pacific Microwave Conference, IEICE, Nov. 4, 2014 (Nov. 4, 2014), pp. 911-913, XP032750578, [retrieved on Mar. 25, 2015] Paragraph [0IIB].

* cited by examiner

| PPDU BW | CASES | # OF ENTIRES | NOTE |
|---|---|---|---|
| 80MHZ PPDU | NO PUNCTURING | 1 | |
| | 20MHZ PUNCTURED | 4 | ANY ONE OUT OF FOUR 20MHZ IS PUNCTURED |
| | TOTAL | 5 | |
| 160MHZ PPDU | NO PUNCTURING | 1 | |
| | 20MHZ PUNCTURED | 8 | ANY ONE OUT OF EIGHT 20MHZ IS PUNCTURED |
| | 40MHZ PUNCTURED | 4 | ANY ONE OUT OF FOUR 40MHZ IS PUNCTURED |
| | TOTAL | 13 | |
| 320MHZ PPDU | NO PUNCTURING | 1 | |
| | 40MHZ PUNCTURED | 8 | |
| | 80MHZ PUNCTURED | 4 | ANY ONE OUT OF FOUR 80MHZ IS PUNCTURED TO FORM 240/160+80MHZ |
| | 320-80-40 | 12 | FOR EACH CONTIGUOUS 240MHZ (FORMED BY EITHER 1ST OR 4TH 80MHZ BEING PUNCTURED), ONE OUT OF SIX 40MHZ IS PUNCTURED |
| | 320-80-80 | 5 | [1 1 X X], [1 X 1 X], [X 1 1 X], [X 1 X 1], [X X 1 1], WHERE 1 OR X REPRESENTS 80MHZ UNPUNCTURED OR PUNCTURED |
| | TOTAL | 30 | |

| PPDU BW | CASES | # OF ENTRIES | NOTE |
|---|---|---|---|
| 80 MHZ PPDU | NO PUNCTURING | 1 | |
| | 20MHZ PUNCTURED | 4 | ANY ONE OUT OF FOUR 20MHZ IS PUNCTURED |
| | 40MHZ PUNCTURED | 3 | [X X 1 1], [1 X X 1], [1 1 X X], WHERE 1 OR X REPRESENTS 20MHZ UNPUNCTURED OR PUNCTURED |
| | TOTAL | 8 | |
| 160 MHZ PPDU | NO PUNCTURING | 1 | |
| | 20MHZ PUNCTURED | 8 | ANY ONE OUT OF EIGHT 20MHZ IS PUNCTURED |
| | 40MHZ PUNCTURED | 4 | ANY ONE OUT OF FOUR 40MHZ IS PUNCTURED |
| | TOTAL | 13 | |
| 320 MHZ PPDU | NO PUNCTURING | 1 | |
| | 40MHZ PUNCTURED | 8 | ANY ONE OUT OF FOUR 80MHZ IS PUNCTURED TO FORM 240/160+80MHZ |
| | 80MHZ PUNCTURED | 4 | |
| | 320-80-40 | 12 | FOR EACH CONTIGUOUS 240MHZ (FORMED BY EITHER 1ST OR 4TH 80MHZ BEING PUNCTURED), ONE OUT OF SIX 40MHZ IS PUNCTURED |
| | 320-80-80 | 5 | [1 1 X X], [1 X 1 X], [X 1 1 X], [X 1 X 1], [X X 1 1], WHERE 1 OR X REPRESENTS 80MHZ UNPUNCTURED OR PUNCTURED |
| | TOTAL | 30 | |

PHYSICAL LAYER PREAMBLE AND SIGNALING FOR WIRELESS COMMUNICATION

CROSS-REFERENCE TO RELATED APPLICATIONS

The present Application for patent is a Continuation of U.S. patent application Ser. No. 16/988,624 filed Aug. 8, 2020, which claims priority to U.S. Provisional Patent Application No. 62/885,192, filed Aug. 9, 2019, U.S. Provisional Patent Application No. 62/926,406, filed Oct. 25, 2019, U.S. Provisional Patent Application No. 62/957,117, filed Jan. 3, 2020, U.S. Provisional Patent Application No. 62/978,297, filed Feb. 18, 2020, U.S. Provisional Patent Application No. 62/984,777, filed Mar. 3, 2020, U.S. Provisional Patent Application No. 63/003,812, filed Apr. 1, 2020, and U.S. Provisional Patent Application No. 63/013,530, filed Apr. 21, 2020, all of which are entitled "PHYSICAL LAYER PREAMBLE AND SIGNALING FOR WIRELESS COMMUNICATION," each of which is assigned to the assignee hereof, and each of which are expressly incorporated by reference in its entirety herein.

TECHNICAL FIELD

This disclosure relates generally to wireless communication, and more specifically, to physical layer preambles and signaling for wireless transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. New WLAN communication protocols are being developed to enable enhanced WLAN communication features. As new WLAN communication protocols enable enhanced features, new preamble designs are needed to support signaling regarding features and resource allocations.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes receiving, via a wireless channel, a packet including a preamble portion and a data portion, the preamble portion including a universal signal field (U-SIG) followed by one or more version-specific signal fields. The method may include determining that the U-SIG includes at least a version identifier, frequency occupation information and a format information field. The method may include determining a format of the packet based, at least in part, on the version identifier and the format information field. The method may include determining one or more subchannels of the wireless channel that include the version-specific signal field based on the frequency occupation information. The method may include receiving at least part of the packet and decoding the version-specific signal field on the one or more subchannels based on the determined format.

Another innovative aspect of the subject matter described in this disclosure can be implemented as an apparatus. The apparatus may include a processor configured to perform any one of the above-mentioned methods.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 12A shows an example table with a 5 to 6 bit design for punctured channel indication options to indicate the non-OFDMA punctured channel pattern.

FIG. 12B shows an example table with a 5 to 6 bit design for punctured channel indication options to indicate the punctured channel pattern for both OFDMA and non-OFDMA.

Like reference numbers and designations in the various drawings indicate like elements.

DETAILED DESCRIPTION

Figure 1:
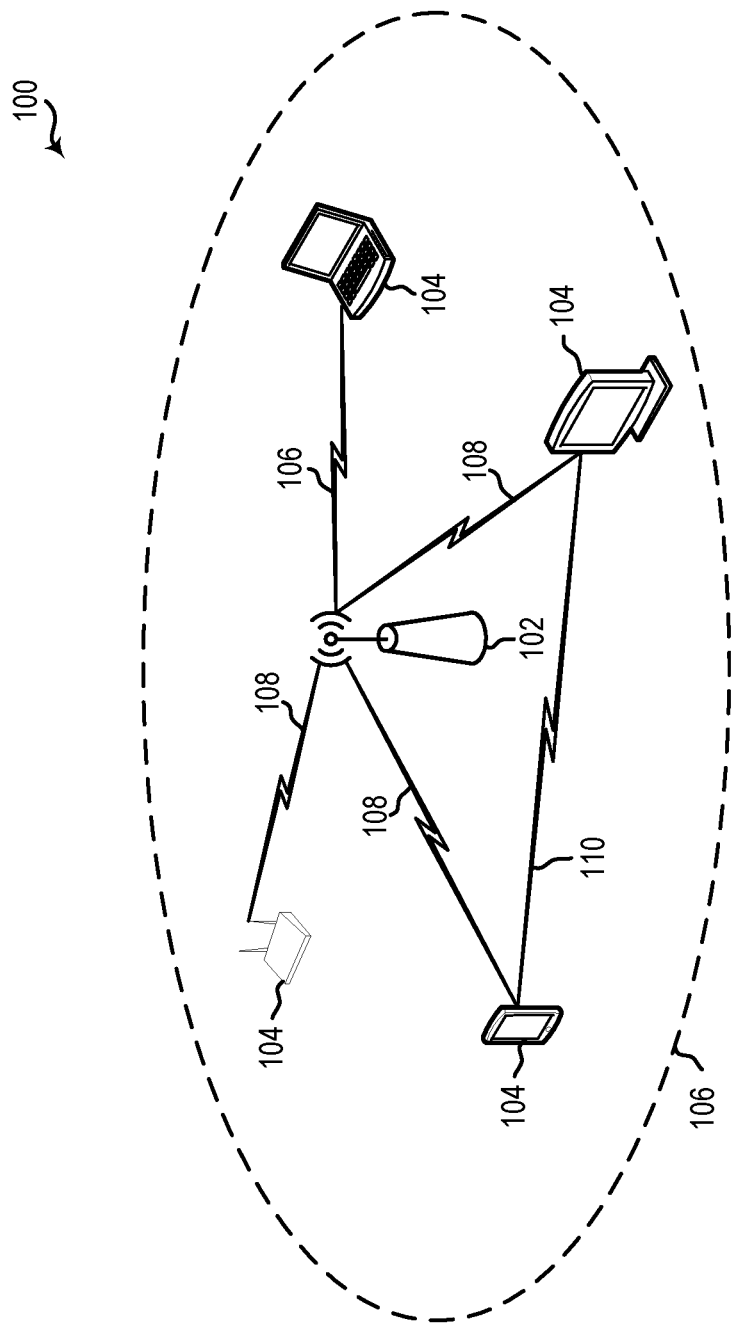
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

A physical layer convergence protocol (PLCP) protocol data unit (PPDU) may span multiple subchannels and may include a preamble portion and a data portion. Signaling refers to control fields or information in the preamble portion that can be used by a wireless communication device to interpret another field or portion of the preamble portion or the data portion of the PPDU. A wireless channel may be formed from multiple subchannels. Portions of the wireless channel bandwidth can be divided or grouped to form different resource units (RUs). Among other things, a preamble portion of a PPDU may include signaling to indicate which RUs are allocated to different devices. Other types of signaling include indicators regarding which subchannels include further signaling or which subchannels may be punctured. There are several formats of PPDUs (and related structures) defined for current wireless communication protocols. As new wireless communication protocols enable enhanced features, new preamble designs are needed support signaling regarding features and resource allocations. Furthermore, it desirable to define a new preamble signaling protocol that can support future wireless communication protocols.

Various implementations relate generally to signaling included in a physical layer preamble that supports new wireless communication protocols. Some implementations more specifically relate to preamble designs for a PPDU in a wireless channel having up to (and potentially more than) 320 MHz bandwidth. In some implementations, the preamble designs are optimized to minimize a length of the preamble portion. Additionally, or alternatively, some implementations more specifically relate to preamble designs that accommodate signal fields of different types. Additionally, or alternatively, some implementations more specifically relate to preamble designs that accommodate parallelization of signaling among different content channels, subchannels, or subbands (which may include groups of subchannels) within a wireless channel. A subband may refer to a portion of the total bandwidth for the wireless channel and may include the use of multiple contiguous or non-contiguous subchannels.

In accordance with various implementations of this disclosure, the signaling may be included in various portions of a physical layer preamble of a wireless packet (for example, a PPDU). In some implementations, the physical layer preamble may be used to indicate puncturing of subchannels or content channels that may carry further signaling. The physical layer preamble signaling may be parallelized for different subchannels of a wireless channel that consists of multiple subchannels. Some implementations of the physical layer preambles may be used to multiplex different types of wireless local area network communications into different subsets of the subchannels that make up the channel.

In some implementations, a universal signal field (U-SIG) may follow legacy signal fields in a preamble portion of a PPDU. The U-SIG may include version independent fields and version dependent fields (that is, fields which depend on the version of the wireless communication protocol used to format or otherwise generate the PPDU). The U-SIG may precede one or more other signal fields that are specific to the wireless communication protocol version identified in the U-SIG. This disclosure includes several example version independent fields and version dependent fields which may be included in the U-SIG.

In some implementations, the information carried in the U-SIG may depend on a format of the PPDU being transmitted. Some or all of the format and contents of the U-SIG may differ for the different formats of PPDUs. The PPDU may be a trigger-based (TB) PPDU, a single-user (SU) PPDU, an extended range (ER) SU PPDU, or a multi-user (MU) PPDU. In some implementations, a unified format for the PPDU may support either SU or MU communications. For example, in some implementations, one format of the U-SIG may be used for PPDUs serving a single user or multiple users. This disclosure includes several example formats for U-SIG that may be used for various PPDU formats.

In some implementations, the U-SIG may be used to indicate a bandwidth, punctured channels, content channel structures, or any combination thereof. For example, the U-SIG may include indicators to indicate a bandwidth structure for the PPDU. The U-SIG may include punctured channel information associated with punctured portions of the bandwidth. In some implementations, the U-SIG may support the use of different content channel structures that include further signaling following the U-SIG.

In some implementations, following the U-SIG, the PPDU may include one or more version-specific signal fields. An example of a version-specific field may include an Extremely High Throughput (EHT) signal field (EHT-SIG). As future versions of the WLAN protocols are developed, they may define different version-specific fields that follow the U-SIG. Thus, the U-SIG described in this disclosure may support many generations of currently developed or future WLAN communication protocols. In some preamble designs, the version-specific signal fields may be different on different subchannels. For example, the EHT-SIG on one subchannel may be different from the EHT-SIG on another subchannel. Furthermore, the PPDU may have a first version-specific signal field (such as the EHT-SIG) for a first communication protocol following the U-SIG on one subchannel and a second version-specific signal field for a different generation of the WLAN communication protocol following the U-SIG on another subchannel. For brevity, this disclosure will describe the EHT-SIG as one example of a version-specific signal field.

In some implementations, the EHT-SIG may include overflow signaling information from the U-SIG as well as additional signaling regarding the data portion of the PPDU. For example, the EHT-SIG may include RU allocation information, spatial stream configuration information, and per-user signaling information, among other examples. This disclosure includes several preamble design options for the EHT-SIG as it relates to the U-SIG.

Particular implementations of the subject matter described in this disclosure can be implemented to realize one or more of the following potential advantages. In some implementations, the described techniques can provide a universal signal field for new wireless communication protocols. The universal signal field may have a format and structure that supports future wireless communication protocols, particularly those in the IEEE 802.11 family. By defining a universal signal field, this disclosure enables the wireless communication protocols to add new features and greater bandwidth support compared to legacy wireless communication protocols.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu$s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
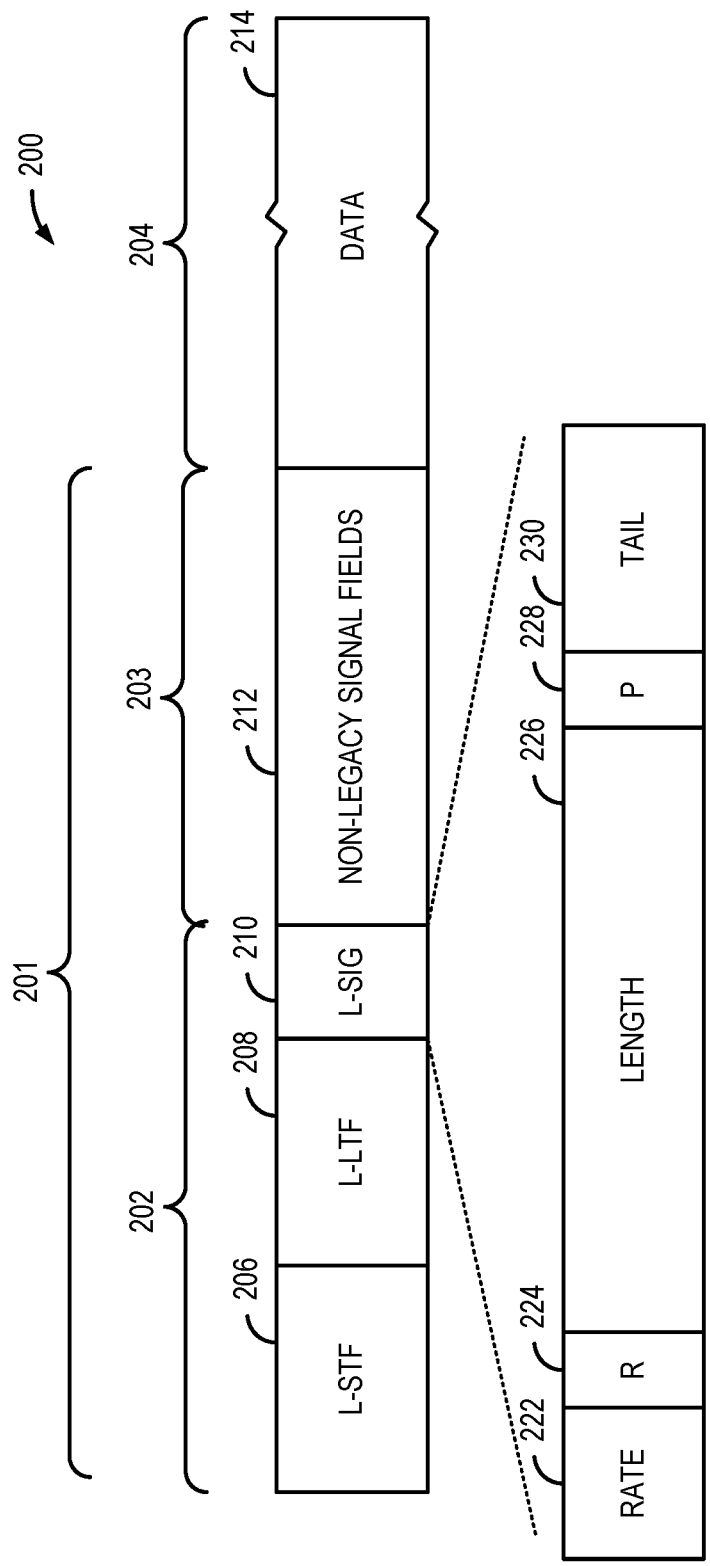
FIG. 2 shows an example protocol data unit (PDU) usable for communications between an access point (AP) and a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a preamble 201 and a payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. FIG. 2 shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards. In some implementations, the second portion 203 of the preamble 201 may include a repeat of the L-SIG (RL-SIG, not shown) before the non-legacy signal fields 212. To accommodate later versions of the IEEE wireless communication protocols, some of the L-SIG 210 fields (such as the data rate field 222 and length field 226) have been redefined or overloaded with new definitions. For example, the data rate field 222 and the length field 226 may be populated with values to identify a type of non-legacy signal fields 212 that will follow. However, such a solution may not be scalable, and the redefined or overloaded L-SIG fields may become saturated as more wireless communication protocols are developed. As described further in this disclosure, the non-legacy signal fields 212 may include a universal signal field (U-SIG, not shown) that is constructed to indicate a type of PDU, a version of the wireless communication protocol associated with the PPDU, a bandwidth, puncturing, or any combination thereof.

Following the non-legacy signal fields 212, the PDU 200 may include a payload 204. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3A:
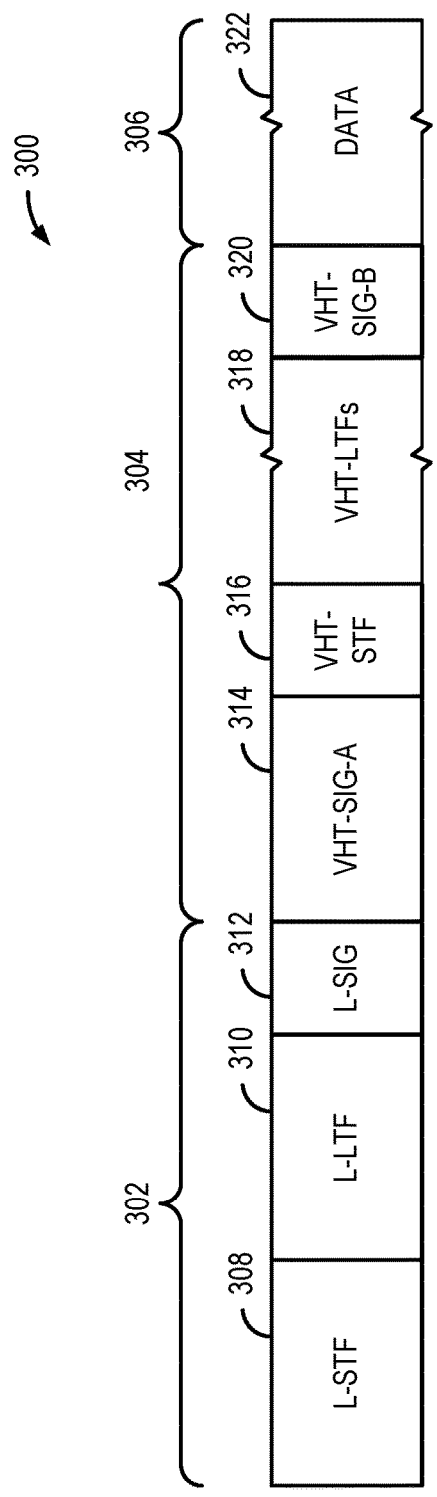
FIG. 3A shows an example PDU usable for communications between an AP and a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ (NSTS) of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
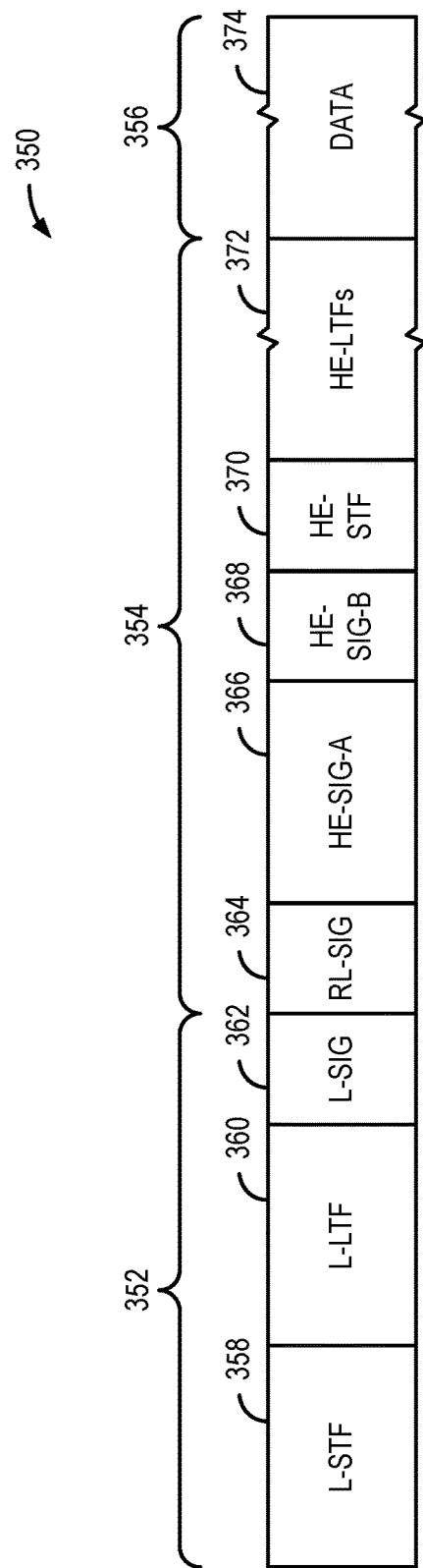
FIG. 3B shows another example PDU usable for communications between an AP and a number of STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
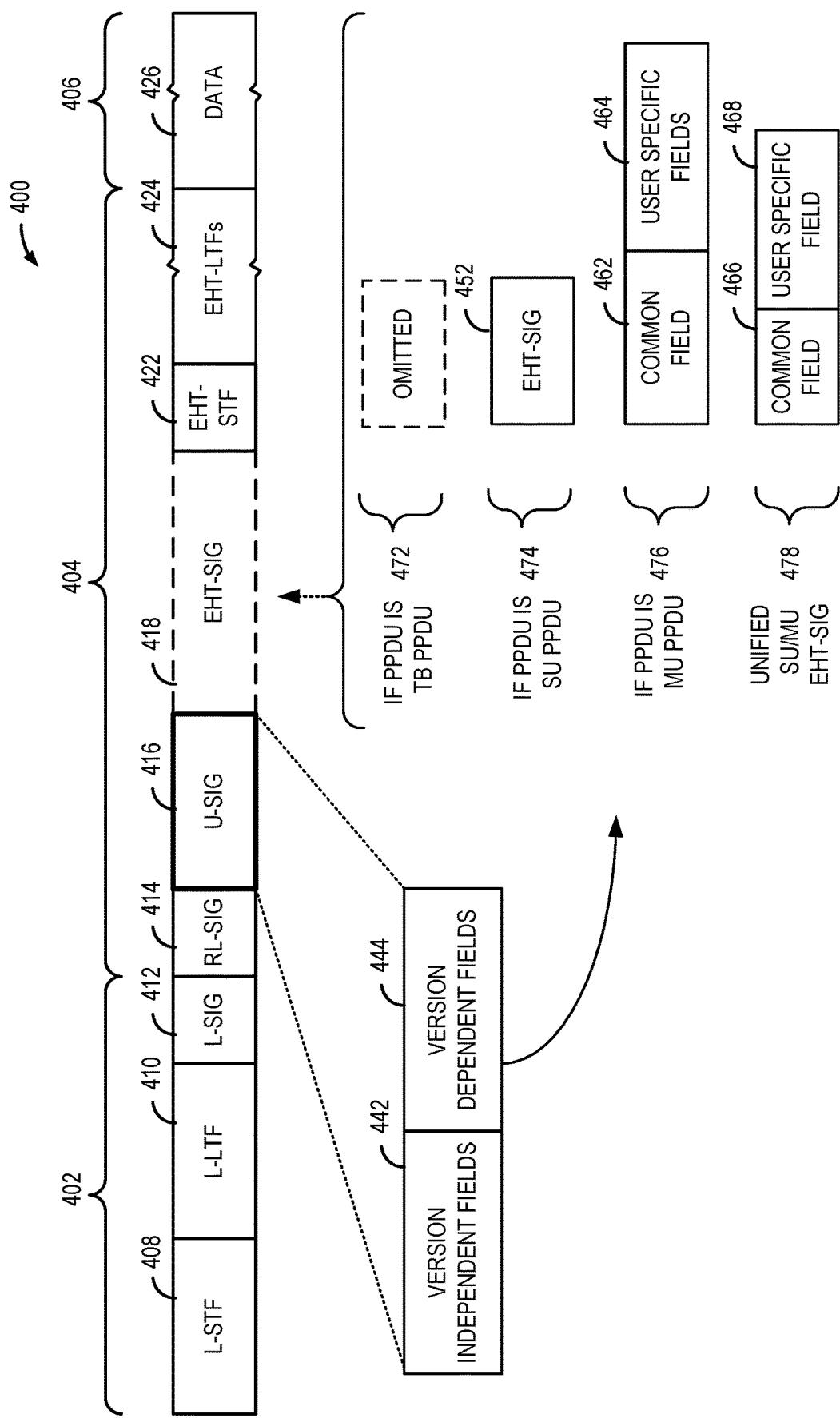
FIG. 4 shows an example PDU that includes a universal signal field (U-SIG) according to some implementations.

FIG. 4 shows an example PDU that includes a universal signal field (U-SIG) according to some implementations. For example, the PDU 400 can be configured as a PPDU. Recall that PDU 300 (FIG. 3A) was formatted in accordance with the IEEE 802.11ac amendment to the IEEE 802.11 wireless communication protocol standard and that PDU 350 (FIG. 3B) was formatted in accordance with the IEEE 802.11ax amendment to the IEEE 802.11 wireless communication protocol standard. In contrast to PDU 300 and PDU 350, the PDU 400 in FIG. 4 may support the IEEE 802.11be amendment as well as future amendments to the IEEE 802.11 wireless communication standard, each of which may be referred to herein as a version of the IEEE 802.11 wireless communication standard. In particular, the PDU 400 may include a universal signal field (U-SIG) 416 that, among other things, may indicate a format of the PPDU, a version of the wireless communication protocol (for example, the Extreme High Throughput (EHT) protocol defined in 802.11be), a bandwidth, puncturing, or any combination thereof. Thus, the U-SIG 416 may precede version-specific signaling that is formatted as an EHT portion of the preamble in accordance with the IEEE 802.11be amendment to the IEEE 802.11 wireless communication protocol standard, or may be formatted as a preamble and frame, respectively, conforming to any later (post-EHT) version of a new wireless communication protocol conforming to a future IEEE 802.11 wireless communication protocol standard or other standard. For brevity, the version-specific fields may be described in terms of EHT signaling.

The PDU 400 includes a PHY preamble including a first portion 402 and a second portion 404. The PDU 400 may further include a PHY payload 406 after the preamble, for example, in the form of a PSDU including DATA field 426. The first portion 402 includes L-STF 408, L-LTF 410, and L-SIG 412. The second portion 404 of the preamble includes a repeated legacy signal field (RL-SIG) 414. Following the RL-SIG 414, the second portion 404 of the preamble includes the U-SIG 416. Depending on the format of the PPDU, the PDU 400 may include a version-specific signal field, such as the EHT-SIG 418. The second portion 404 further includes an additional short training field (referred to herein as "EHT-STF" although it may be structured as, and carry version-dependent information for, other wireless communication protocol versions beyond EHT) 422 and a number of additional long training fields (referred to herein as "EHT-LTFs" 424 although they may be structured as, and carry version-dependent information for, other wireless communication protocol versions beyond EHT).

The U-SIG 416 may include version independent fields 442 and version dependent fields 444. Examples of the version independent fields 442 may include a version identifier, an indication of whether the PDU 400 is an uplink (UL) or a downlink (DL) PPDU, a BSS color, and a transmission opportunity (TxOP) duration, among other examples. The version identifier in the version independent fields 442 may indicate a version (and associated format) for the version dependent fields 444. In some implementations, the version dependent fields 444 may indicate a PPDU format (such as in a format information field). The PPDU format may determine which other indicators are included in the version dependent fields 444 as well as the format or contents of the rest of U-SIG 416 and the EHT-SIG 418. For example, depending on the value of the PPDU format field in the version dependent fields 444, the PDU 400 may include different formats 472, 474, 476, or 478 for the EHT-SIG 418. In some implementations, if the PPDU format field indicates that the PDU 400 is a trigger-based (TB) PPDU, then the EHT-SIG may be omitted (as shown in format 472). If the PPDU format field indicates that the PDU 400 is a single user (SU) PPDU, then the EHT-SIG 452 may be formatted as shown in format 474. For example, the EHT-SIG 452 for the SU PPDU may be a single symbol length and may be modulated using a fixed MCS (such as rate ½, BPSK). If the PPDU format field indicates that the PDU 400 is a multi-user (MU) PPDU, there may be other format information fields, such as EHT-SIG MCS, EHT-DCM, EHT-SIG compression, number of EHT-SIG symbols or number of non-OFDMA users, among other examples, to interpret the EHT-SIG structure and content. Then the EHT-SIG may be formatted as shown in format 476. For example, the EHT-SIG may include a common field 462 and one or more user-specific fields 464. The format 476 for MU PPDU may be multiple symbol lengths and may have a variable MCS as indicated in the U-SIG 416.

In some other implementations, a PPDU (which may be referred to as a unified SU/MU PPDU) may be formatted to support either single user (SU) or multiple users (MU) payload. The unified SU/MU PPDU may include a U-SIG 416 that has a consistent field structure regardless of whether the unified SU/MU PPDU is carrying SU or MU traffic. Furthermore, the U-SIG 416 may be followed by an EHT-SIG 418 having a unified SU/MU EHT-SIG format 478. In the unified approach, there may not be a separate format 474 and 476 for the SU and MU PPDU formats. Rather the unified SU/MU PPDU may have a U-SIG 416 and EHT-SIG format 478 that supports MU specific signal field or SU specific signal fields. For example, when used for SU traffic, the EHT-SIG format 478 may have a compressed version of the EHT-SIG defined for the MU format 476. For example, the unified SU/MU EHT-SIG format 478 may include a compressed mode for the common field 466 and may include only one user specific field 468. For a PPDU that occupies the full bandwidth and is directed to a single user, the common field 466 may omit some unneeded information, such as resource unit (RU) allocations, among other examples. The U-SIG 416 may be a two-symbol length followed by an EHT-SIG 418 that has an adjustable MCS indicated by the U-SIG 416. The EHT-SIG for the unified SU/MU EHT-SIG format 478 may be multiple symbol lengths and may use a determinable MCS (such as rate ½, BPSK).

In some implementations, U-SIG 416 may include PPDU bandwidth (BW) and punctured channel information. The PPDU BW and punctured channel information may be referred to collectively as frequency occupation indications. The frequency occupation indications may permit WLAN devices on the wireless channel to determine the utilization of the various parts of the wireless channel. For example, the frequency occupation information may be used to indicate puncturing of some subchannels.

Figure 5A:
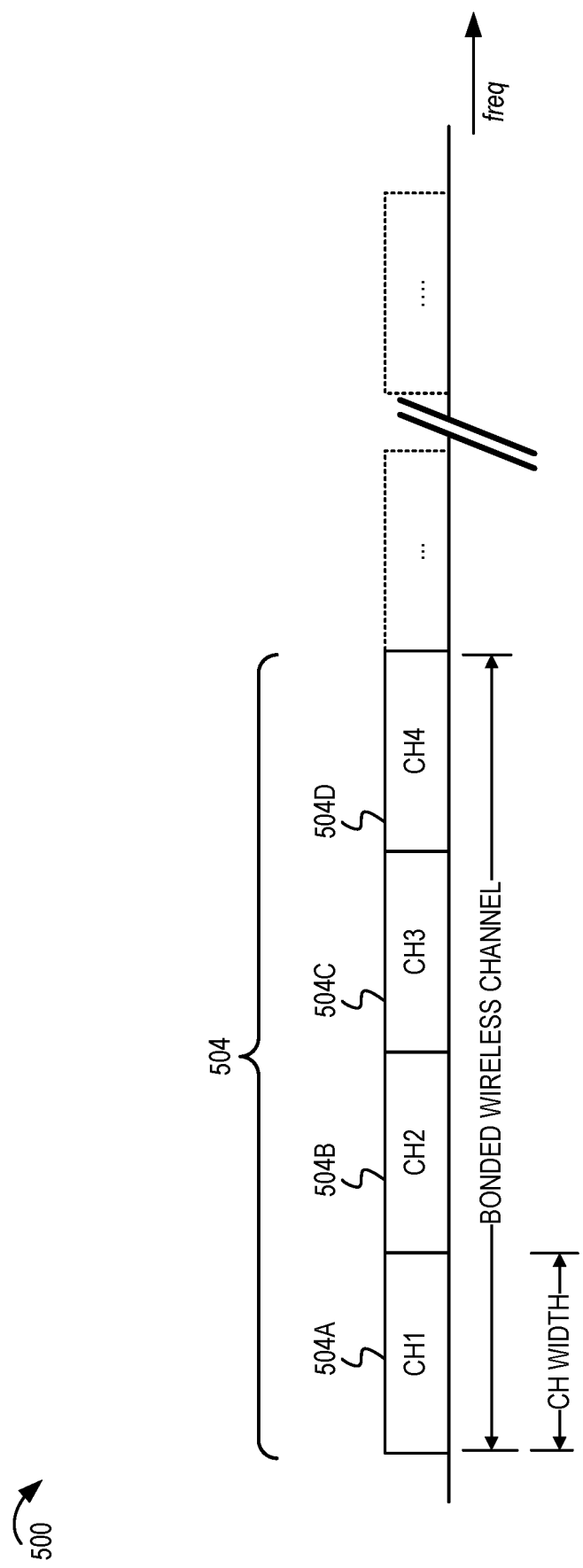
FIG. 5A shows an example bonded wireless channel that includes multiple subchannels.

FIG. 5A shows an example bonded wireless channel 500 that includes multiple subchannels. In FIG. 5, a channel map for a frequency band (such as the 2.5 GHz, 5 GHz, or 6 GHz frequency bands) may define multiple channels 504. In the example of FIG. 5A, each channel 504 has a uniform channel width W (such as 20 MHz, 40 MHz, or 80 MHz, among other examples). Some WLAN devices are capable of transmitting at higher bandwidths using a wireless channel that is made up of multiple channels (which may be referred to as subchannels when used as part of a larger wireless channel). In the example of FIG. 5A, the wireless channel 500 may be used to transmit an 80 MHz transmission by bonding together a group of four subchannels 504 (a first subchannel 504A, a second subchannel 504B, a third subchannel 504C, and a fourth subchannel 504D). Although depicted as contiguous subchannels in the channel map, in some implementations, the wireless channel 500 may contain subchannels 504 which are not adjacent in the channel map. Additionally, larger groups of channels 504 may be used in some implementations. For example, IEEE 802.11ax provides for the use of 8 subchannels, and later versions of IEEE 802.11 may provide for the use of 16 (or more) subchannels for higher bandwidth transmissions.

Figure 5B:
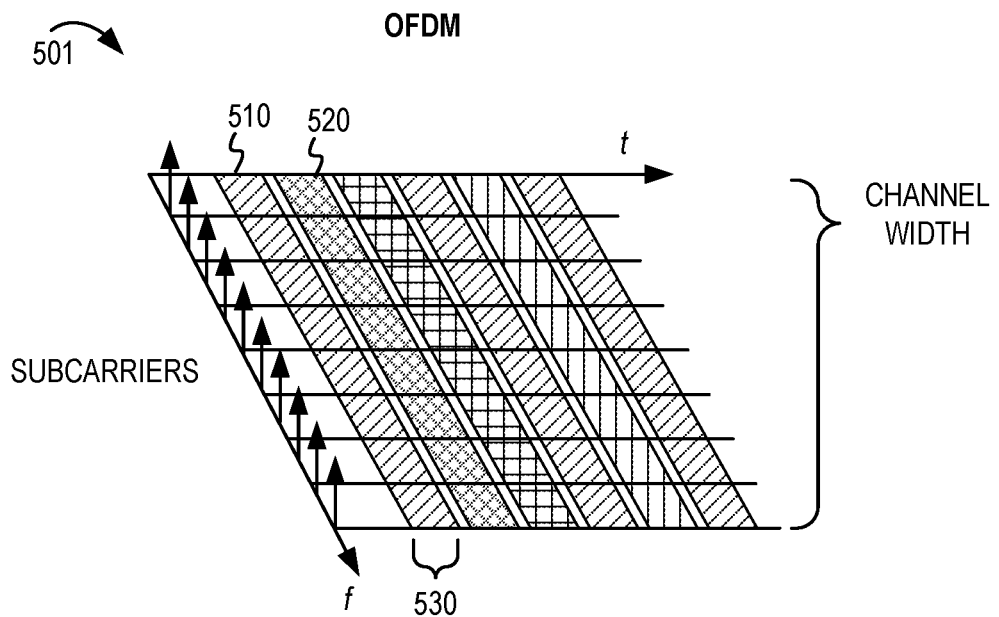
FIG. 5B shows a conceptual diagram of orthogonal frequency-division multiplexing (OFDM).

FIG. 5B shows a conceptual diagram of traditional OFDM 501. The OFDM channel width may include multiple subcarriers. A WLAN packet (also referred to as a PPDU) includes data that is encoded using the subcarriers of the channel width. For example, a first STA may transmit a first PPDU 510 during a first time period 530. During a second time period, a second STA may transmit a second PPDU 520. The time durations of the PPDUs 510 and 520 may be the same or different. Typically, the first STA and the second STA (and any other STAs in the BSS) will contend for access to the channel. Once the STA wins the contention, the STA can use the channel for transmission of a PPDU. As shown in FIG. 5B, the different shadings of the PPDUs indicate that different STAs may utilize the wireless channels sequentially, one at a time. However, this communication structure may be inefficient if a WLAN device does not have enough data to justify using the full channel bandwidth. The IEEE 802.11ax standard introduced the use of OFDMA in a WLAN.

Figure 5C:
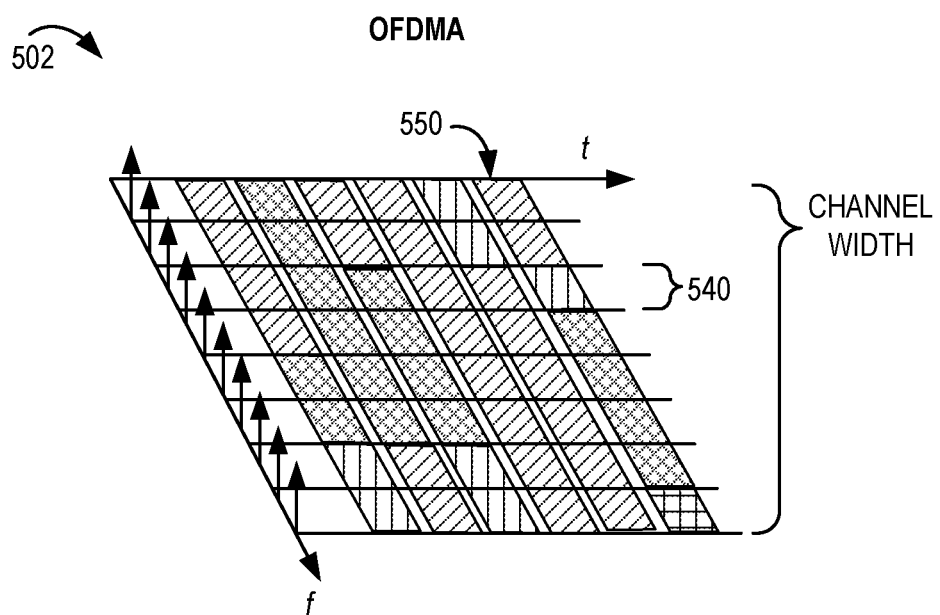
FIG. 5C shows a conceptual diagram of orthogonal frequency-division multiple access (OFDMA) illustrating resource assignments of a wireless channel.

FIG. 5C shows a conceptual diagram of OFDMA 502 illustrating resource assignments of a wireless channel. OFDMA breaks down the full channel width into a plurality of resource units (RUs). Each RU may include a different quantity of subcarriers. Using OFDMA, a first WLAN device (such as an AP) may allocate different RUs for different STAs. As shown in FIG. 5C, the different shadings indicate different RUs of PPDU that may be transmitted to (or allocated for the use by) different STAs. For example, a PPDU 550 may include different RUs allocated for a first STA, a second STA, a third STA, and a fourth STA. One RU 540 is allocated for a STA to transmit uplink data in the PPDU 550, while other RUs are allocated for different STAs. The allocation of RUs may be used for downlink transmissions or to schedule channel access.

Figure 6:
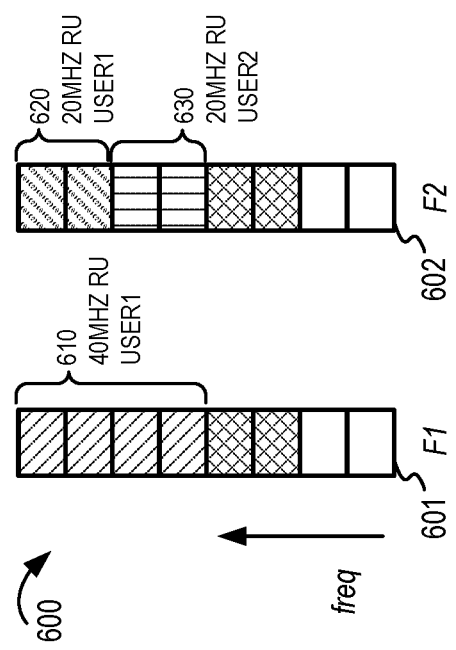
FIG. 6 depicts an example series of wireless frames using OFDMA.

FIG. 6 depicts an example series of wireless frames 600 using OFDMA. A first frame 601 (F1) includes a first RU 610 allocated to a first STA ("user1"). For example, the first RU 610 may be used for downstream traffic from an AP to a first STA (user1). In FIG. 6, the first RU 610 is a 40 MHz RU (684 tones). If there is more data to send to user1, the AP may allocate a second RU 620 in the next wireless frame (second frame 602, F2). In the second frame 602, a second RU 620 is allocated to the user1. The second RU 620 of the second frame 602 is a 20 MHz RU (242 tones) associated with the fourth subchannel. The second frame 602 also allocates a third RU 630 to a second STA ("user2").

The example shown and described with reference to FIG. 6 is didactic in nature and merely illustrates one of many examples that may be supported by aspects of this disclosure. For example, the RU allocation technique in this disclosure could be used with a 160 MHz wide channel and RU allocations with two or more users. In another example, a 320 MHz wide channel could support 240 MHz allocated to user1 (using a combination of smaller RU sizes) and 80 MHz allocated to user2. In some implementations, RUs may be allocated or combined in non-contiguous portions of the PPDU.

Figure 7:
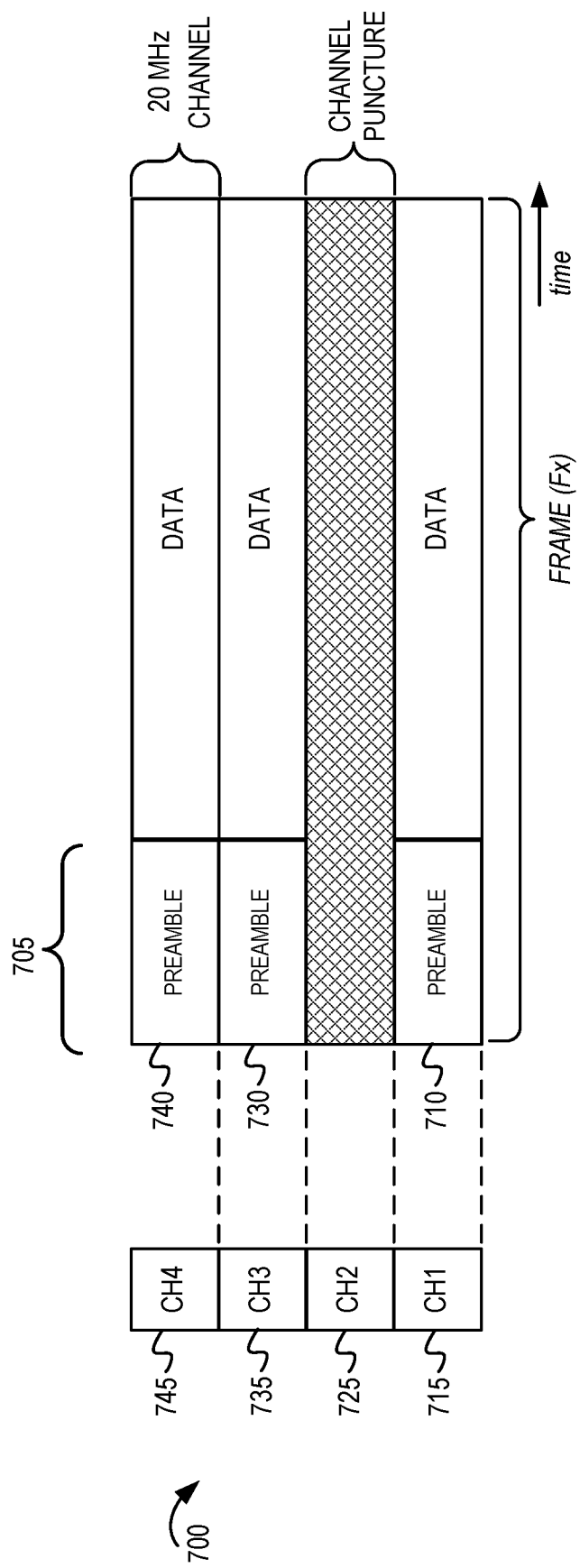
FIG. 7 depicts an example punctured transmission.

FIG. 7 depicts an example punctured transmission 700. In particular, FIG. 7 shows a conceptual time-based illustration of the transmissions that may be present on a first subchannel 715, a second subchannel 725, a third subchannel 735, and a fourth subchannel 745 of the wireless channel. For non-triggered transmissions, which are not prompted (or triggered) by a previous transmission, a WLAN device would perform a clear channel assessment (CCA, not shown) before sending the non-triggered transmission. The CCA is a type of collision avoidance technique. Other types may be referred to as carrier sense, carrier detect, listen-before-talk, among other examples. CCA is performed by a WLAN device to determine if the wireless communication medium (such as the group of subchannels) is available or busy (by another transmission). If the wireless communication medium is in use, the WLAN device may postpone transmission until the CCA is performed again and the wireless communication medium is not in use by another device.

In FIG. 7, there is an incumbent system transmission that occupies part of the second subchannel 725. Therefore, the wireless channel may be punctured to exclude the second subchannel 725 from the transmission. Thus, transmission 700 is sent only on the first sub channel 715, the third subchannel 735 and the fourth subchannel 745. The preamble 705 may include signaling 710, 730, and 740 on the non-punctured subchannels 715, 735, and 745, respectively. However, signaling may be omitted from the second subchannel 725.

Figure 8:
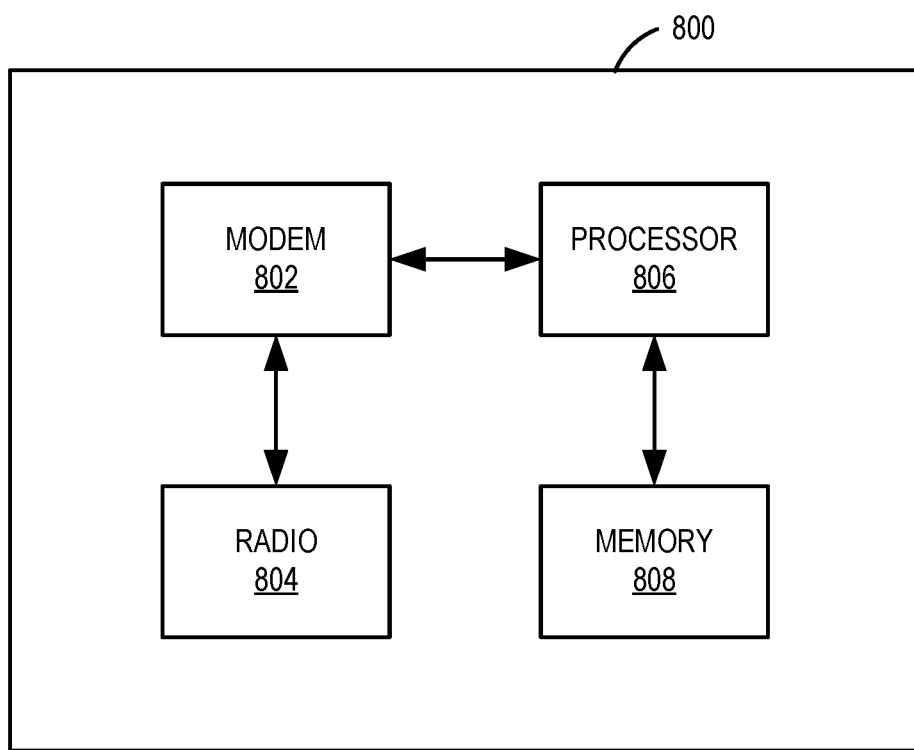
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 806 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
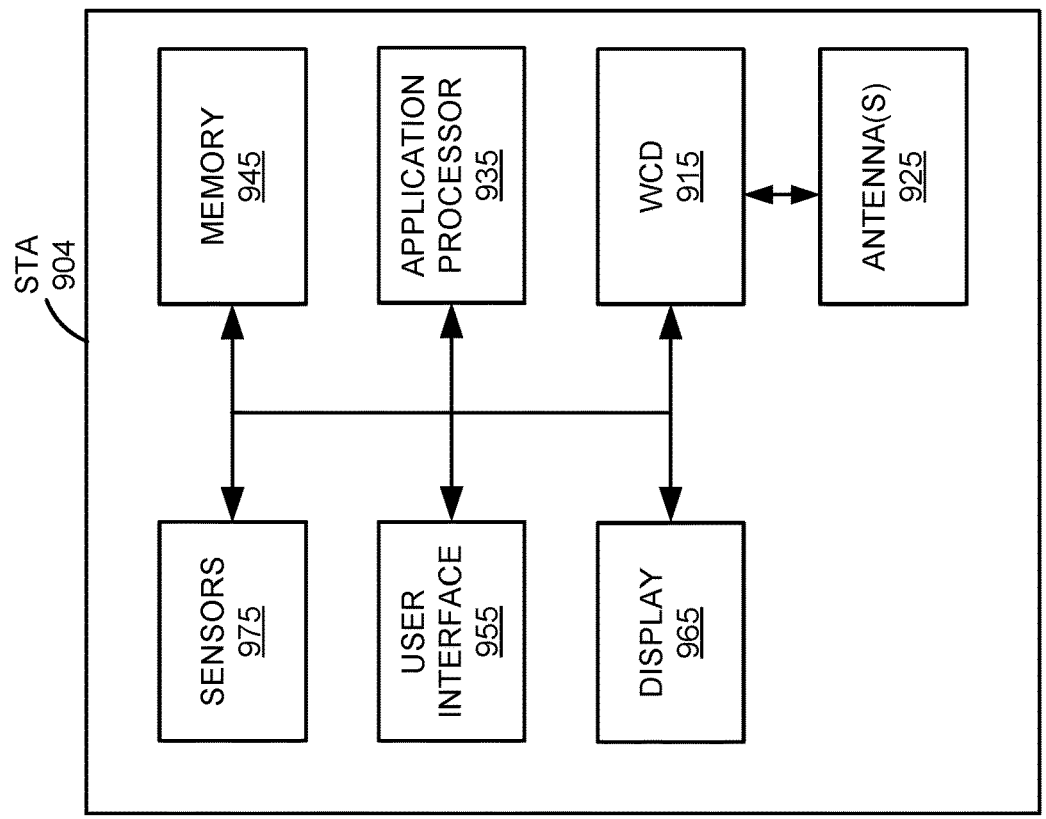
FIG. 9B shows a block diagram of an example STA.
Figure 9A:
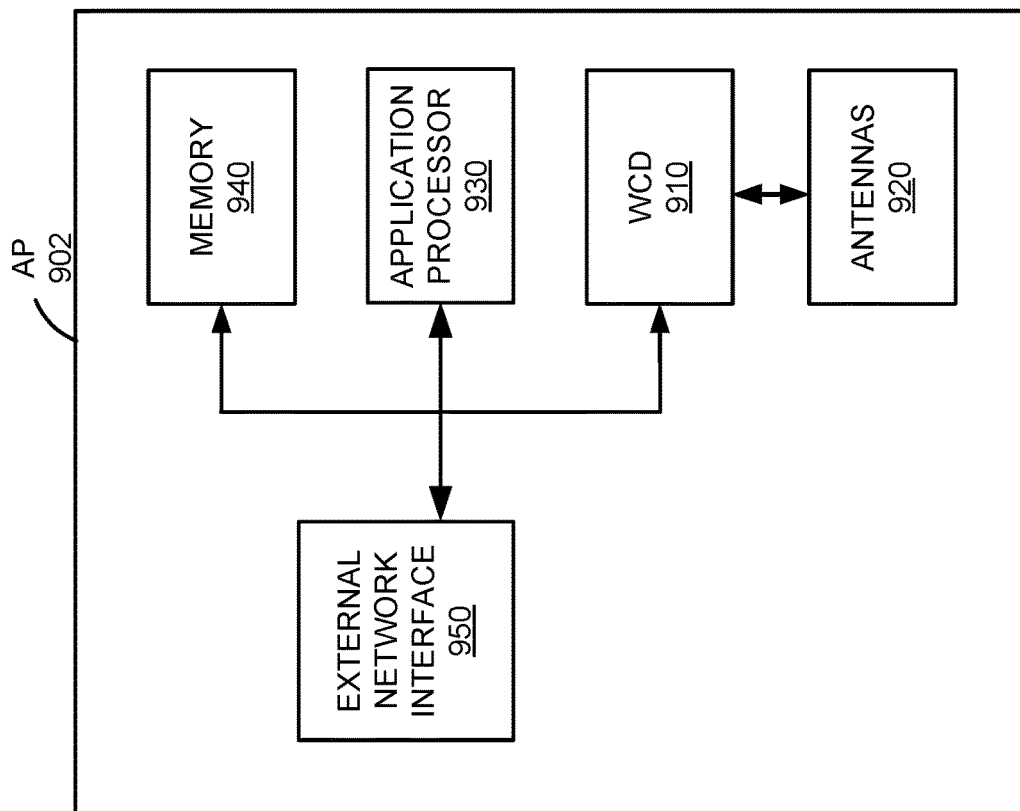
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, as new wireless communication protocols enable enhanced features, new preamble designs are needed support signaling regarding features and resource allocations. Various implementations relate generally to signaling included in a physical layer preamble that supports new wireless communication protocols. Some implementations more specifically relate to preamble designs that do not significantly add to the preamble length. Additionally, or alternatively, some implementations more specifically relate to preamble designs that accommodate signal fields of different types. Additionally, or alternatively, some implementations more specifically relate to preamble designs that accommodate parallelization of signaling among different content channels, subchannels, or subbands (groups of subchannels) within a wireless channel.

Figure 10:
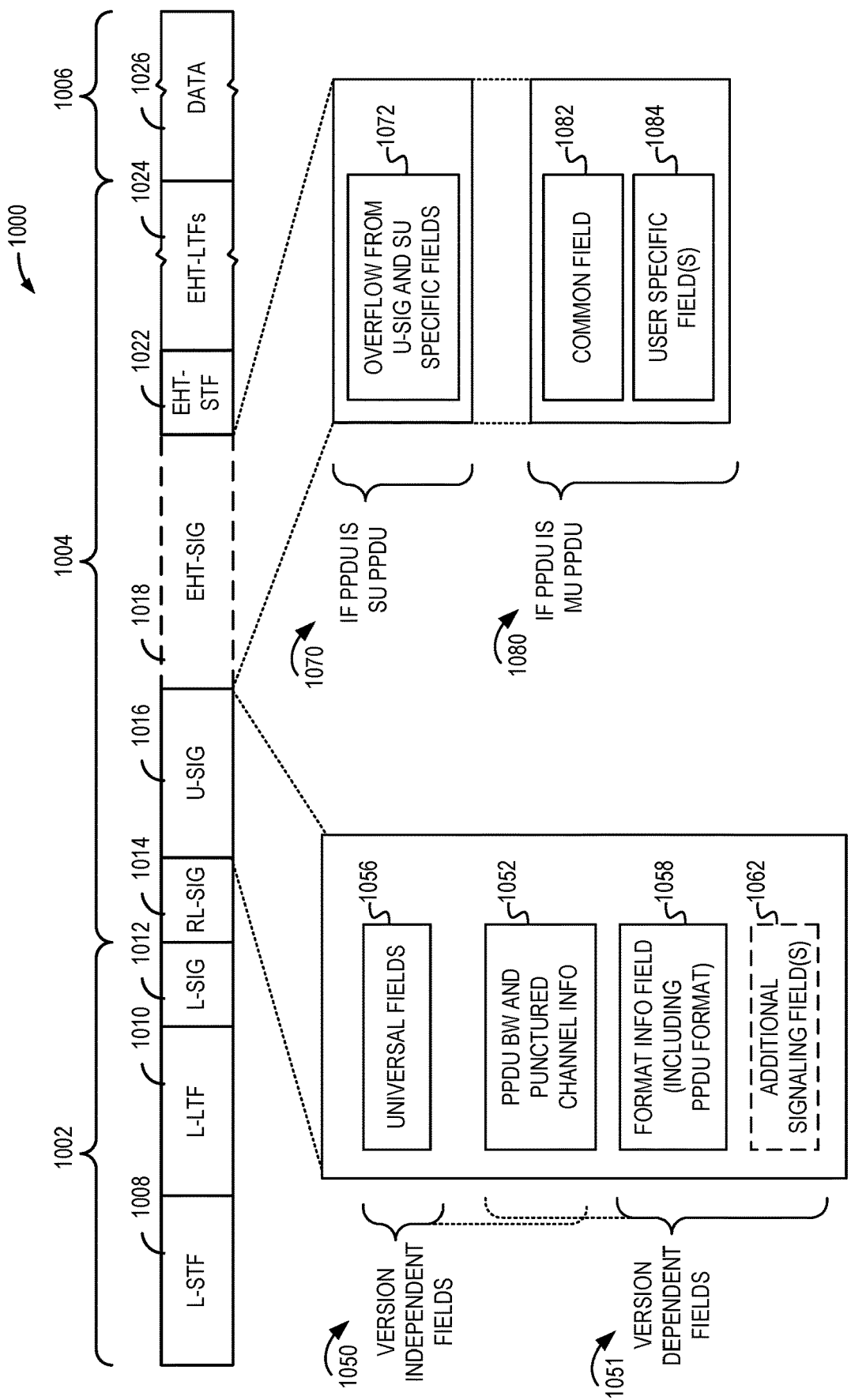
FIG. 10 shows an example physical layer convergence protocol (PLCP) protocol data units (PPDU) usable for communications between an AP and a number of STAs according to some implementations.

FIG. 10 shows an example PPDU 1000 usable for wireless communication between an AP and a number of STAs according to some implementations. The PPDU 1000 may be used for SU, MU-OFDMA or MU-MIMO transmissions. The PPDU 1000 includes a PHY preamble including a first portion 1002 and a second portion 1004. The PPDU 1000 may further include a PHY payload 1006 after the preamble, for example, in the form of a PSDU including DATA field 1026. The first portion 1002 includes L-STF 1008, L-LTF 1010, and L-SIG 1012. The second portion 1004 of the preamble and DATA field 1026 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The second portion 1004 of the preamble includes a repeated legacy signal field (RL-SIG) 1014 and multiple wireless communication protocol version-dependent signal fields after RL-SIG 1014. For example, the second portion may include a second signal field (referred to herein as "U-SIG") 1016, and a third signal field (referred to herein as "EHT-SIG" although it may be structured as, and carry version-dependent information for, other wireless communication protocol versions beyond EHT) 1018. The second portion 1004 further includes an additional short training field (referred to herein as "EHT-STF" although it may be structured as, and carry version-dependent information for, other wireless communication protocol versions beyond EHT) 1022 and a number of additional long training fields (referred to herein as "EHT-LTFs" although they may be structured as, and carry version-dependent information for, other wireless communication protocol versions beyond EHT) 1024. Like L-STF 1008, L-LTF 1010, and L-SIG 1012, the information in RL-SIG 1014, the U-SIG 1016 and EHT-SIG 1018 may be duplicated and transmitted in each of the component 20 MHz subchannels (which may include content channels) in instances involving the use of a bonded channel. In some implementations, EHT-SIG 1018 may additionally or alternatively carry information in one or more non-primary 20 MHz channels that is different than the information carried in the primary 20 MHz subchannel In some implementations, the EHT-SIG may have some content that is the same in all 20 MHz subchannels and may have some other content that is different for one or more of the 20 MHz subchannels.

RL-SIG 1014 and U-SIG 1016 may indicate to EHT- or later version-compliant STAs 104 that the PPDU 1000 is an EHT PPDU or a PPDU conforming to another non-legacy wireless communication protocol version. For example, U-SIG 1016 may be used by a receiving device to interpret bits in one or more of EHT-SIG 1018 or DATA field 1026. In some implementations, U-SIG 1016 may include a reserved bit that indicates whether the PPDU 1000 is, for example, compliant with EHT or a later version (for example, after IEEE 802.11ax) of the IEEE 802.11 family of wireless communication protocol standards or other standards. In some implementations, U-SIG 1016 includes a version field that includes at least one bit indicating the particular wireless communication protocol version to which the PPDU 1000 conforms. In some implementations, U-SIG 1016 further includes at least one universal bit that is independent of the wireless communication protocol version.

A device receiving the PPDU 1000 may initially begin or continue its determination of the wireless communication protocol version used to transmit the PPDU 1000 based on the presence of RL-SIG 1014 and the modulation scheme used to modulate the symbols in U-SIG 1016. In some implementations, a receiving device may initially determine that the wireless communication protocol used to transmit the PPDU 1000 is an HE or later version based on the presence of RL-SIG 1014 (that is, a determination that the first symbol of the second portion of the preamble is identical to L-SIG 1012) and a determination that both the first symbol and the second symbol following RL-SIG 1014 are modulated according to a BPSK modulation scheme (for example, BPSK ½ as opposed to a Q-BPSK or other modulation scheme) like L-STF 1008, L-LTF 1010, L-SIG 1012 and RL-SIG 1014. In this way, STAs that are compliant with HE, but not compliant with EHT or later versions, may interpret the PPDU 1000 as an HE PPDU and may respect the duration of the PPDU 1000 indicated by L-SIG 1012. Furthermore, the ability of HE devices to interpret information, such as an indication of whether the PPDU 1000 is an uplink (UL) or a downlink (DL) PPDU, a BSS color, and a transmission opportunity (TxOP) duration, associated with EHT- or later version-compliant transmissions enables advanced deferral techniques.

Although the presence of RL-SIG 1014 and the modulation scheme may indicate that an HE or later IEEE 802.11 wireless communication protocol was used to transmit the PPDU 1000, in some implementations, to indicate that the PPDU is an EHT or later 802.11 wireless communication protocol version, the transmitting device sets the value of a reserved bit in U-SIG 1016 such that it is inverted (or "flipped") relative a value of a reserved bit in a corresponding bit location within HE-SIG-A (for example, the reserved bit may have a value of logic "0" instead of a logic "1" expected in HE-SIG-A). In some such implementations, the value of the reserved bit itself does not indicate the particular version, rather, it is the (for example, 16-bit) value of the version field that identifies the particular version of the set of possible versions. In some other implementations, more than one reserved bit may be used to indicate the version and a separate version field may not be used.

As described previously, in IEEE 802.11be, and future generations, new fields may be used to carry signaling information. For example, the new fields and signaling information may be included in the U-SIG 1016. Additionally, new fields and signaling information may be included in the EHT-SIG 1018 (or may overflow into the EHT-SIG 1018). If additional training signals are sent on other tones prior to U-SIG (such as additional training signals in L-SIG and RL-SIG in 11ax), then each symbol in U-SIG may carry more usable data for feature signaling rather than training signals. In some implementations, U-SIG 1016 includes two symbols, which may be jointly encoded together in a single block, and which may each carry at least twenty-four usable data (or "information") bits. In some implementations, the U-SIG 1016 may support 26 bits per symbol by using four extra tones for signaling. Thus, there may be a total 52 bits available from among the two symbols for the U-SIG 1016. This disclosure includes several options to enable the U-SIG 1016 and EHT-SIG 1018 could carry 2 more bits per symbol compared to L-SIG (which carries 24 bits). For example, the training signals on extra tones (such as [−28,−27,27,28]) may be sent on L-SIG and RL-SIG as in IEEE 802.11ax. The channel estimate of these 4 tones are ready after RL-SIG, so those extra four tones may be used for signaling starting from the U-SIG. In yet another option, the training signals on extra tones (such as [−28,−27,27,28]) may be sent on L-LTF and L-SIG. The receiver may attempt to use 52 data tones if the energy detection and comparing signals in those 4 tones in L-LTF & L-SIG indicate training. Then, those extra four tones may be enabled for signaling starting with the U-SIG.

The bits in the U-SIG 1016 may include signaling regarding types or formats of additional signal fields (such as the EHT-SIG 1018) that follow the U-SIG 1016. The U-SIG 1016 may include two types of content, such as version independent fields 1050 and version dependent fields 1051. In some implementations, the version independent fields 1050 includes universal fields 1056, such as a version identifier to indicate the WLAN protocol version of the packet (e.g., one value to indicate 802.11be), an indicator whether the PPDU is uplink or downlink (UL/DL indicator), a transmission opportunity (TX OP) field, or a BSS color, among other examples.

The U-SIG 1016 may include frequency occupation indications that permit any WLAN devices on the wireless channel to determine the utilization of the various parts of the wireless channel. For example, the U-SIG 1016 may include a PPDU BW and punctured channel information field 1052. The PPDU BW and punctured channel information field 1052 may include a PPDU BW value, punctured channel indicators, or any combination thereof. The PPDU BW and punctured channel information field 1052 may be included in the version independent fields 1050 or the version dependent fields 1051. The PPDU BW and punctured channel information field 1052 may be included in the version independent fields 1050 to explicitly indicate a full puncturing pattern of the specific 80 MHz so that bystanders will know the punctured channels. Alternatively, the PPDU BW and punctured channel information field 1052 may be included in the version dependent fields 1051 if there is no need to inform bystanders. Examples of the PPDU BW and punctured channel information field 1052 are further described in FIGS. 11, 12A and 12B.

In addition to the version independent fields 1050, the U-SIG 1016 may include version dependent fields 1051. Examples of the version dependent fields 1051 may include a format information field 1058 and additional signaling field(s) 1062. The format information field 1058 may indicate a format of the remaining fields of the U-SIG 1016 as well as the format of EHT-SIG 1018 (if included). For example, the format information field 1058 may include a PPDU format field which indicates whether the PPDU 1000 is a trigger-based (TB) PPDU, a single user (SU) PPDU, or a multi-user (MU) PPDU. In some implementations, the format information field 1058 may alter how the rest of the U-SIG 1016 and the EHT-SIG 1018 are structured. For example, the format of the additional signaling fields 1062 and the EHT-SIG 1018 may depend on the value in the format information field 1058. In some implementations, the format information field 1058 may include a PPDU format field which indicates whether the PPDU is a TB PPDU, an SU PPDU, or an MU PPDU. For a TB PPDU, the EHT-SIG 1018 may not be present. For an SU PPDU, the EHT-SIG 1018 may have a first format 1070. And, for a MU PPDU, the EHT-SIG 1018 may have a second format 1080. The format and contents of the additional signaling fields 1062 and the EHT-SIG 1018 are described further below. A U-SIG 1016 also may include a CRC and a tail (not shown). The CRC may protect the earlier fields of the U-SIG 1016. In some implementations, the CRC may protect earlier fields of the U-SIG 1016 as well as all or part of the L-SIG.

EHT-SIG 1018 may include one or more jointly encoded symbols and may, in some implementations, be encoded in a different block from the block in which U-SIG 1016 is encoded. EHT-SIG 1018 may be used by an AP to identify and inform multiple STAs 104 that the AP has scheduled UL or DL resources. EHT-SIG 1018 may be decoded by each compatible STA 104 served by the AP 102. The U-SIG 1016 may include information usable by the identified STAs 104 to decode an EHT-SIG 1018. The U-SIG 1016 may generally be used by a receiving device to interpret bits in the EHT-SIG 1018 or the DATA field 1026. For example, the U-SIG 1016 may indicate a format of the EHT-SIG 1018 in the various component channels, available channel bandwidths, and modulation and coding schemes (MCSs), among other possibilities. EHT-SIG 1018 may further include a cyclic redundancy check (CRC) (for example, four bits) and a tail (for example, 6 bits) that may be used for binary convolutional code (BCC).

The EHT-SIG 1018 may carry STA-specific scheduling information such as, for example, per-user MCS values and per-user RU allocation information. EHT-SIG 1018 may generally be used by a receiving device to interpret bits in the DATA field 1026. In the context of DL MU-OFDMA, such information enables the respective STAs 104 to identify and decode corresponding RUs in the associated DATA field 1026. Each EHT-SIG 1018 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. The common field may have a varying length. Each user-specific field may include multiple user block fields (which may be followed by padding). Each user block field may include, for example, two user fields that contain information for two respective STAs to decode their respective RU payloads.

In some implementations, the EHT-SIG 1018 contents are duplicated in every content channel. In some other implementations, a parallelization design for EHT-SIG 1018 (or part of the EHT-SIG 1018) may include spreading different fields into different content channels. Table 1 summarizes how the U-SIG 1016 and the EHT-SIG 1018 may be formatted differently for different PPDU formats (such as different formats for a TB PPDU, an SU PPDU, or an MU PPDU).

TABLE 1

Examples of U-SIG and EHT-SIG

| PPDU Format | U-SIG | EHT-SIG |
|---|---|---|
| TB PPDU | Version independent fields: (17 bits)<br>Version identifier: ~3 bits<br>UL/DL: 1 bit<br>TXOP: >=7 bits<br>BSS color: >=6 bits<br>Version independent or dependent fields:<br>PPDU BW and punctured channel information: >=4 bits<br>Option 1: 1 subfield to include both PPDU BW and punctured channel information: >=4 bits<br>Option 2: 2 subfields as following<br>PPDU BW: 3 bits<br>Punctured channel information: >=4 bits<br>Version dependent fields:<br>Format info field: 2 bits<br>PPDU format field: 1-2 bits<br>Additional signal fields:<br>Spatial reuse field: 2 bits or 4 bits or 8 bits<br>Reserved<br>CRC: 4 bits<br>Tail: 6 bits | not included |
| SU PPDU | Version independent fields: (17 bits)<br>Version identifier: ~3 bits<br>UL/DL: 1 bit<br>TXOP: >=7 bits<br>BSS color: >=6 bits<br>Version independent or dependent fields:<br>PPDU BW and punctured channel information: >=4 bits<br>Option 1: 1 subfield to include both PPDU BW and punctured channel information: >=4 bits<br>Option 2: 2 subfields as following<br>PPDU BW: 3 bits<br>Punctured channel information: >=4 bits<br>Version dependent fields:<br>Format info field: 2 bits<br>PPDU format field: 2 bits<br>Additional signal fields: (which may carry over into EHT-SIG)<br>SU specific fields:<br>MCS: 4 bits<br>DCM: 1 bit<br>Coding: 1 bit<br>Beamformed: 1 bit<br>Spatial reuse: 4 bits<br>GI + LTF size: 2 bits<br>Number of EHT-LTF symbols and midamble periodicity (or NSTS and midamble periodicity): ~4 bits<br>Doppler: 1 bit<br>LDPC extra symbol segment: 1 bit<br>STBC (space time block code): 1 bit<br>Pre-FEC padding factor: 2 bits<br>PE (packet extension) disambiguity: 1 bit<br>Beam Change: 1 bit<br>CRC: 4 bits<br>Tail: 6 bits | 1 symbol EHT-SIG;<br>Includes bits overflowed to EHT-SIG from the U-SIG. May be encoded in 1 symbol using same coding rate and modulation as U-SIG, such as, rate ½ BCC encoded and BPSK modulated |
| MU PPDU | Version independent fields: (17 bits)<br>Version identifier: ~3 bits<br>UL/DL: 1 bit<br>TXOP: >=7 bits<br>BSS color: >=6 bits<br>Version independent or dependent fields:<br>PPDU BW and punctured channel information: >=4 bits<br>Option 1: 1 subfield to include both | variable length EHT-SIG;<br>MCS of transmitting EHT-SIG may be indicated in the U-SIG<br>Further includes:<br>Common field: (size depends on bandwidth of the wireless channel)<br>Additional info fields |

TABLE 1-continued

Examples of U-SIG and EHT-SIG

| PPDU Format | U-SIG | EHT-SIG |
|---|---|---|
| | PPDU BW and punctured channel information: >=4 bits<br>Option 2: 2 subfields as following<br>PPDU BW: 3 bits<br>Punctured channel information: >=4 bits<br>Version dependent fields:<br>Format info field: 12-13 bits (tentative)<br>PPDU format field: 2 bits<br>EHT-SIGMCS: 2-3 bits (tentative)<br>EHT-SIG DCM: 0-1 bit (tentative)<br>Number of EHT-SIG symbols (or number of MU-MIMO users): 5 bits (tentative)<br>EHT-SIG compression fields: 1-2 bits (tentative)<br>Additional signal fields common to all users: (which may carry over into EHT-SIG)<br>Spatial reuse: 4 bits<br>GI + LTF size: 2 bits<br>Number of EHT-LTF symbols and midamble periodicity: ~4 bits<br>Doppler: 1 bit<br>LDPC extra symbol segment: 1 bit<br>STBC (space time block code): 1 bit<br>Pre-FEC padding factor: 2 bits<br>PE (packet extension) disambiguity: 1 bit<br>Beam Change: 1 bit<br>CRC: 4 bits<br>Tail: 6 bits | overflowed from U-SIG<br>Resource allocation information<br>User Specific field:<br>One or more user block fields with per-STA and per-RU information |
| Unified SU/MU PPDU Format | Version independent fields: (17 bits)<br>Version identifier: ~3 bits<br>UL/DL: 1 bit<br>TXOP: >=7 bits<br>BSS color: >=6 bits<br>Version independent or dependent fields:<br>PPDU BW and punctured channel information: >=4 bits<br>Option 1: 1 subfield to include both PPDU BW and punctured channel information: >=4 bits<br>Option 2: 2 subfields as following<br>PPDU BW: 3 bits<br>Punctured channel information: >=4 bits<br>Version dependent fields:<br>Format info field: 12-13 bits (tentative)<br>PPDU format field: 1-2 bits<br>EHT-SIG MCS: 2-3 bits (tentative)<br>EHT-SIG DCM: 0-1 bit (tentative)<br>Number of EHT-SIG symbols (or number of MU-MIMO users): 5 bits (tentative)<br>EHT-SIG compression fields: 1-2 bits (tentative)<br>Additional signal fields common to all users (or SU): (which may carry over into EHT-SIG)<br>Spatial reuse: 0 or 2 or 4 bits<br>GI + LTF size: 2-3 bits<br>Number of EHT-LTF symbols and midamble periodicity: 3-4 bits<br>Doppler: 1 bit<br>LDPC extra symbol segment: 1 bit<br>STBC (space time block code): 0-1 bit<br>Pre-FEC padding factor: 2 bits<br>PE (packet extension) disambiguity: 1-2 bit<br>Beam Change: 1 bit<br>CRC: 4 bits<br>Tail: 6 bits | variable length EHT-SIG;<br>MCS of transmitting EHT-SIG may be indicated in the U-SIG<br>Further includes:<br>Common field: (size depends on bandwidth of the wireless channel)<br>Additional info fields overflowed from U-SIG<br>Resource allocation information (which may be omitted for SU)<br>User Specific fields:<br>One or more user block fields with per-STA and per-RU information |

For a TB PPDU, the additional signaling fields 1062 may include one or more indicators regarding spatial reuse. For example, in some implementations, the additional signaling fields 1062 may include a spatial reuse field that includes 4-bits. The 4-bit field may indicate spatial reuse for the entire PPDU BW, or for an 80 MHz portion of the wireless channel. The spatial reuse field may be different for each 80 MHz portion of the wireless channel. In some other implementations, the spatial reuse field may include 8-bits and may indicate spatial reuse for each half BW of the entire PPDU BW, or each 40 MHz portion within an 80 MHz portion of the wireless channel. As indicated above, the EHT-SIG 1018 may not be present in a TB PPDU.

For an SU PPDU, the additional signaling fields 1062 may include one or more of the following indicators: a guard interval and long training field size (GI+LTF, such as 2 bits), a number of EHT-LTF symbols and midamble periodicity (or NSTS and midamble periodicity) (such as 4 bits), a doppler indicator (such as 1 bit), an LDPC extra symbol segment (such as 1 bit), a space time block code (STBC, such as 1 bit), a Pre-FEC padding factor (such as 2 bits), a packet extension (PE) disambiguity indicator (such as 1 bit), and a beam change (such as 1 bit), among other examples. Note that some of these aforementioned indicators may carry over into part of the EHT-SIG 1018 or may be signaled in the EHT-SIG 1018 (rather than the U-SIG 1016). For example, the EHT-SIG 1018 may include overflow from the U-SIG and SU specific fields 1072. The SU specific fields may include an MCS indicator (such as 4 bit), a DCM indicator (such as 1 bit), a coding indicator (such as 1 bit), a beamform indicator (such as 1 bit), or a spatial reuse (such as 4 bits or 8 bits), among other examples.

For an MU PPDU, the additional signaling fields 1062 may include one or more of the following indicators: a spatial reuse (such as 4 bits), a guard interval and long training field size (GI+LTF, such as 2 bits), a number of EHT-LTF symbols and midamble periodicity (such as 4 bits), a doppler indicator (such as 1 bit), an LDPC extra symbol segment (such as 1 bit), a space time block code (STBC, such as 1 bit), a Pre-FEC padding factor (such as 2 bits), a packet extension (PE) disambiguity indicator (such as 1 bit), and a beam change (such as 1 bit), among other examples. Note that some of these aforementioned indicators may carry over into part of the EHT-SIG 1018 or may be signaled in the EHT-SIG 1018 (rather than the U-SIG 1016). For example, a common field 1082 may include the overflow bits from the additional signaling fields 1062. Furthermore, the common field 1082 may include resource allocation information (such as RU allocations for one or more STAs). A user specific field 1084 may include one or more user block fields. For example, there may be a different user block field for each resource allocation indicated in the common field 1082. In some implementations, the EHT-SIG compression field (such as 2 bits) may be used to indicate one unpunctured non-OFDMA compression mode, one punctured non-OFDMA compression mode and one uncompressed mode (for OFDMA). In some implementations, the EHT-SIG compression field (such as 1 bit) may be used to indicate one (punctured or unpunctured) non-OFDMA compression mode, and one uncompressed mode (for OFDMA).

For a unified SU/MU PPDU format, the additional signaling fields 1062 may include fields that are used for either SU or MU transmissions, including one or more of the following indicators: a spatial reuse (such as 4 bits), a guard interval and long training field size (GI+LTF, such as 2 bits), a number of EHT-LTF symbols and midamble periodicity (such as 4 bits), a doppler indicator (such as 1 bit), an LDPC extra symbol segment (such as 1 bit), a space time block code (STBC, such as 1 bit), a Pre-FEC padding factor (such as 2 bits), a packet extension (PE) disambiguity indicator (such as 1 bit), and a beam change (such as 1 bit), among other examples. Note that some of these aforementioned indicators may carry over into part of the EHT-SIG 1018 or may be signaled in the EHT-SIG 1018 (rather than the U-SIG 1016). For example, a common field 1082 may include the overflow bits from the additional signaling fields 1062. If the unified SU/MU PPDU is directed to multiple users, the common field 1082 may include resource allocation information (such as RU allocations for one or more STAs). Alternatively, if the unified SU/MU PPDU is directed to a single user and there is no preamble puncturing, the RU allocation information may be omitted. In some uses of the SU/MU PPDU, such as when SU preamble puncturing is used, the RU allocation information may be included (optionally, in a compressed version compared to the RU allocation subfield for a traditional multi-user transmission). A user specific field 1084 may include one or more user block fields. For example, if the unified SU/MU PPDU is directed to multiple users, there may be a different user block field for each resource allocation indicated in the common field 1082. Alternatively, if the unified SU/MU PPDU is directed to a single user, there may be only one user field (of non-MU-MIMO format) in which the SU specific fields (such as MCS, DCM, coding, beamformed, among other examples) may be merged. Compared to the SU specific fields, there are additional fields, such as STA ID field (11 bits) and NSTS (4 bits) that may be included in the user field.

The unified MU/SU PPDU format may support either MU or SU traffic. For a full BW SU transmission, the cost of using the unified MU/SU PPDU format U-SIG is an additional 26 bits (other format info fields (11 bits) in U-SIG for MU PPDU, STA ID field (11 bits) and NSTS field (4 bits) in the user field) as compared to an SU PPDU format. However, it may be desirable to use the unified MU/SU PPDU format for higher bandwidth communication protocols, such as IEEE 802.11be and beyond. The total size of the U-SIG and EHT-SIG for the unified MU/SU PPDU would be >=73 bits (for the PPDU formatted for a single user transmission), which could be populated in a 2-symbol U-SIG and a tightly fit 2-symbol EHT-SIG (of BPSK, rate ½). In some implementations, a 3-symbol EHT-SIG of (BPSK, rate ½) may be used if the PPDU BW & puncturing info field(s) use >4 bits, or if there is signaling for additional features. In some implementations, the EHT-SIG compression field (such as 2 bits) may be used to indicate one unpunctured non-OFDMA compression mode, one punctured non-OFDMA compression mode and one uncompressed mode (for OFDMA). In some implementations, the EHT-SIG compression field (such as 1 bit) may be used to indicate one (punctured or unpunctured) non-OFDMA compression mode, and one uncompressed mode (for OFDMA). In some implementations, the EHT-SIG compression field (such as 2 bits) may be used to indicate one (punctured or unpunctured) SU compression mode (to support a single user transmission), one (punctured or unpunctured) non-OFDMA compression mode (for MU-MIMO transmission to support more than one user), and one uncompressed mode (for OFDMA transmission).

Some fields of the EHT-SIG may be transmitted in a specific 20 MHz subchannel of a first content channel, and different fields may be transmitted in a different 20 MHz subchannel of a second content channel. While the contents or values within the EHT-SIG may be different for different content channels, the format and field structures of the EHT-SIG may be consistent for all content channels. The content channel (including the EHT-SIG) may be eliminated for subchannels that are punctured (as indicated in the PPDU BW and punctured channel information field 1052).

As shown in Table, 1, there may be different ways to format the PPDU BW and punctured channel information. In one example format option, the PPDU BW and punctured channel information may be formatted as a single value from a lookup table that includes entries for various combinations of PPDU BW and puncturing. In another example format option, the PPDU BW and punctured channel information may be formatted as a separate subfields where a first subfield includes a value that indicates the PPDU BW and a second subfield includes a value that indicates the punctured channel information.

The fields and field sizes in Table 1 are provided as illustrative examples. Some implementations may include additional fields or different sizes.

Figure 11:
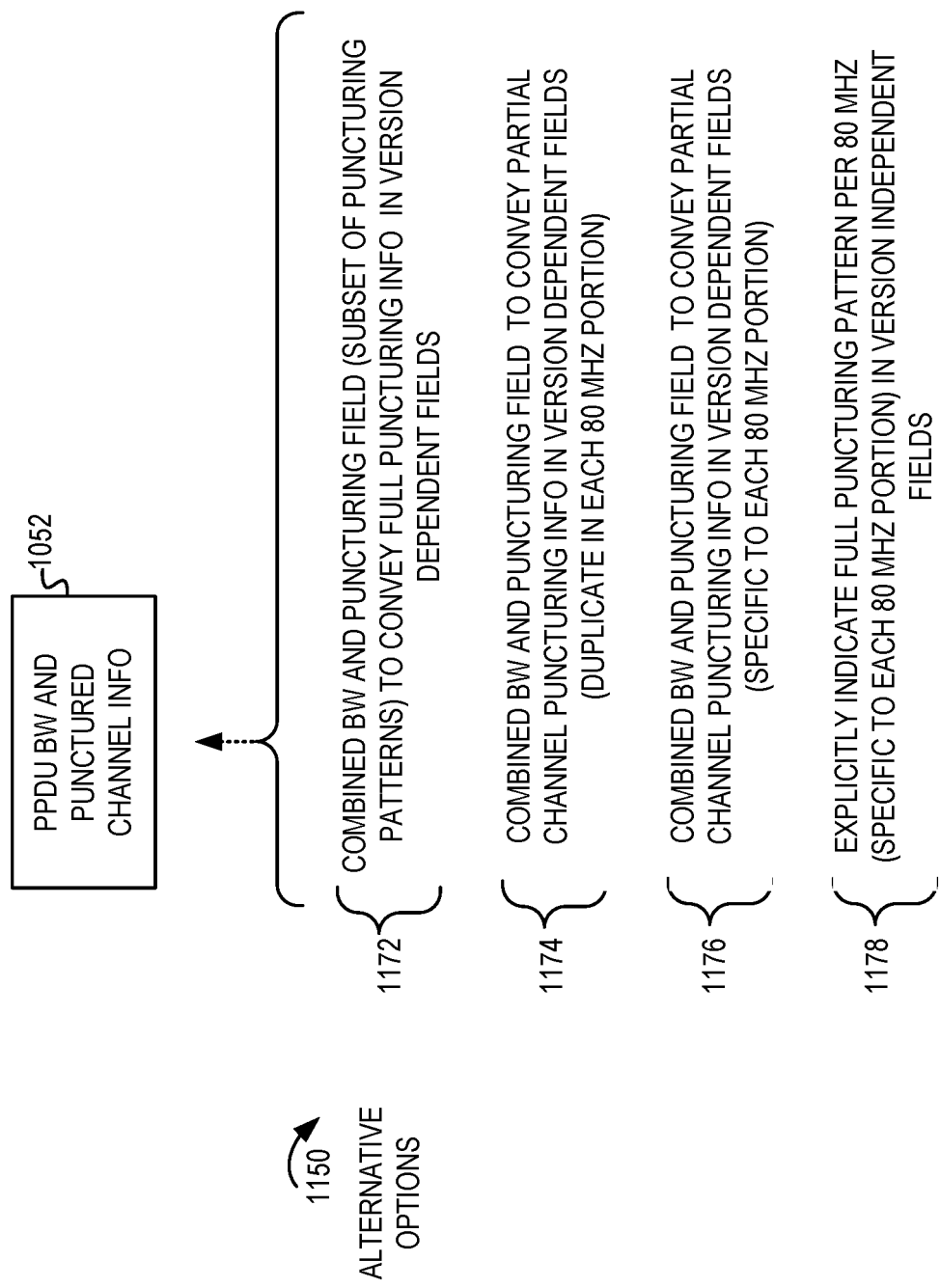
FIG. 11 shows example options for PPDU bandwidth (BW) and punctured channel information according to some implementations.

FIG. 11 shows example options for PPDU BW and punctured channel information according to some implementations. As indicated above, there may be alternative options 1150 for the content and format of the PPDU BW and punctured channel information field 1052. In some options 1172, 1174, and 1176, the PPDU BW and punctured channel information field 1052 may be included in the version dependent fields of the U-SIG. For example, these options may be used if there is no need to inform bystanders. In another option 1178, the PPDU BW and punctured channel information field 1052 may be included in the version independent fields.

In a first option 1172, the PPDU BW and punctured channel information field 1052 may include a value representing a combined BW and puncturing configuration to convey full puncturing information. The value may be determined from a table in which different bit values (possibly up to 8 bits or more) represent different combinations of BW and puncturing.

In a second option 1174, the PPDU BW and punctured channel information field 1052 may convey partial channel puncturing information (at the content channel level). The PPDU BW and punctured channel information field 1052 may represent the puncturing for the primary 80 MHz subchannel and the value of the PPDU BW and punctured channel information field 1052 may be duplicated in each 80 MHz subchannel that makes up the full channel.

In a third option 1176, the PPDU BW and punctured channel information field 1052 may convey partial channel puncturing information (at the content channel level). However, different from option 1174, the third option 1176 utilizes different values for each different 80 MHz subchannel of the full channel. Thus, the PPDU BW and punctured channel information field 1052 includes a value in each 80 MHz subchannel that is specific to that 80 MHz subchannel.

In a fourth option 1178, the PPDU BW and punctured channel information field 1052 may explicitly indicate the full puncturing pattern per 80 MHz. This option 1178 may be used, in some implementations, to inform bystanders of the punctured 20 MHz subchannels in each specific 80 MHz subchannel, and to inform intended recipients so that recipients know the content channel locations in each specific 80 MHz subchannel.

In some implementations, the PPDU BW and punctured channel information field 1052 may include a punctured channel bitmap to indicate the punctured channels. In one option, the PPDU BW and punctured channel information field 1052 may be a 4-bit value that includes a value selected from a lookup table. Each potential value of the PPDU BW and punctured channel information field 1052 in the lookup table may relate to a particular bandwidth of the channel. Additionally, some values may further indicate a fixed set of puncturing configurations. In another option, the PPDU BW and punctured channel information field 1052 may be a 3-bit value that indicates a value selected from the lookup table for a particular bandwidth. In such an example, U-SIG may further include a punctured channel bitmap (not shown) that follows the 3-bit value. The punctured channel bitmap (if included) may indicate puncturing at different granularities. For example, in some implementations, the punctured channel bitmap may be a per 80 MHz bitmap in which each bit indicates puncturing (or not) of a respective one of the 80 MHz subchannels of the wireless channel. In some other implementations, the punctured channel bitmap may be a per 20 MHz bitmap in which each bit indicates puncturing (or not) of a 20 MHz subchannel. In some implementations, parallelization may be used to prepare different punctured channel bitmaps for each 80 MHz subchannel of the wireless channel. For example, the punctured channel bitmap may be a per 20 MHz bitmap in which each bit indicates puncturing (or not) of a 20 MHz subchannel within a respective one of the 80 MHz portions of the wireless channel. Thus, the punctured channel bitmap may be different for each 80 MHz portion and may include bits that are specific to that 80 MHz portion.

In some implementations, the PPDU BW and punctured channel information are separate subfields. The PPDU BW subfield may use 3 bits to indicate the PPDU BW, including but not limited to the following: 20 MHz, 40 MHz, 80 MHz, 160 MHz (or 160/80+80 MHz), 320 MHz (or 320/160+160 MHz). The indication of 320 MHz (or 320/160+160 MHz) may be just one entry, or two entries to indicate both the PPDU BW as well as how the channelization of the 320 MHz for disambiguity. For example, one entry may be 320 MHz (lower 160 MHz) to indicate the PPDU BW is 320 MHz and the current 160 MHz subchannel is the lower 160 MHz channel of the PPDU BW; the other entry may be 320 MHz (upper 160 MHz) to indicate the PPDU BW is 320 MHz and the current 160 MHz subchannel is the upper 160 MHz channel of the PPDU BW.

In some implementations, the punctured channel information may use 5 to 6 bits to indicate the punctured channel information, which may depend on the PPDU BW as well as the EHT-SIG compression field (which indicates whether the PPDU is OFDMA or non-OFDMA, which may include the SU transmission and the non-OFDMA MU-MIMO transmission). For example, if the EHT-SIG compression field indicates that it is an uncompressed mode (for example, OFDMA transmission), 4 bits out of the 5-6 bit field are used to indicate the per 20 MHz punctured channel bitmap of the current 80 MHz. If the EHT-SIG compression field indicates that it is a non-OFDMA compressed mode, the 5-6 bits field is used to indicate the non-OFDMA punctured channel pattern.

FIG. 12A shows an example table 1202 with a 5 to 6 bit design for punctured channel indication options to indicate the non-OFDMA punctured channel pattern. Each entry of the table 1201 may provide information about the puncturing information including the non-OFDMA punctured channel pattern.

FIG. 12B shows an example table 1202 with a 5 to 6 bit design for punctured channel indication options to indicate the punctured channel pattern for both OFDMA and non-OFDMA. Each entry of the table 1202 may provide information about the puncturing information including the OFDMA or non-OFDMA punctured channel pattern. If the EHT-SIG compression field indicates that it is an uncompressed mode (for example, OFDMA transmission), the 5-6 bit field is used to indicate the punctured channel information of the current 80 MHz by using the rows of the table 1202 corresponding "80 MHz/segment." If the EHT-SIG compression field indicates that it is a non-OFDMA compressed mode, the 5-6 bits field is used to indicate the non-OFDMA punctured channel pattern, by looking at the rows corresponding to the PPDU BW.

Spatial Reuse (SR) Field

Recall that in IEEE 802.11ax, there are 4 bits for each spatial reuse (SR) field. For SU and MU PPDUs, the SR field is for entire PPDU BW. For a TB PPDU, each spatial reuse field is for a 20 MHz subband if the total BW is <=80 MHz, or a 40 MHz subband if the total BW is 160 MHz. However, a bystander only needs to know the spatial reuse info of the particular 80 MHz, instead of entire PPDU BW. Therefore, the SR field may be modified for use with IEEE 802.11be and beyond. For example, for SU/MU PPDUs, the SR field may be for the particular 80 MHz. For a TB PPDU, the SR field may be a 4 bit value representing SR for a particular 80 MHz. The SR field may carry different values in different 80 MHz subchannels. In another option, for a TB PPDU, the SR field (or SR fields) may include a total of 8 bits per 80 MHz, where there are 4 bits for each SR field for a 40 MHz channel. Each SR field may be for a 40 MHz subband within the particular 80 MHz and may carry different values in different 80 MHz channels. In some implementations, the SR field may use 2 bits to indicate including a subset of states that the 11ax 4-bit SR field could indicate.

In some implementations, parallelization may be used on U-SIG and the EHT-SIG. Parallelization may involve not duplicating signaling in all 20 MHz subchannels. Parallelization may involve using same field structure in all 20 MHz subchannels, but using different values in some signaling field in different 20 MHz subchannels. In contrast, different signaling may be carried in different subchannels, such as the different subchannels in the different content channels, as described previously herein.

In some implementations, a parallelization design for U-SIG may include using same field structure in all 20 MHz subchannels. All U-SIG in the 20 MHz subchannels within one 80 MHz segment carry same signaling information. Particular fields in U-SIG may carry different values in different 80 MHz segments.

In some implementations, the coding block structure of EHT-SIG may depend on the EHT-SIG compression field and PPDU bandwidth. In one option, in the punctured non-OFDMA compression mode (for SU and MU-MIMO transmission) and the unpunctured non-OFDMA compression mode (for SU and MU-MIMO transmission), or the (punctured and unpunctured) non-OFDMA compression mode (for SU and MU-MIMO transmission), the EHT-SIG common field in each content channel uses one encoded block to encode all subfields. In the uncompressed mode (for OFDMA transmission), if the PPDU bandwidth is 20 MHz, 40 MHz, or 80 MHz, the EHT-SIG common field in each content channel may use one encoded block to encode all subfields; if the PPDU bandwidth is 160 MHz and above (such as 240 MHz, 320 MHz, 480 MHz, 640 MHz, among other examples), the EHT-SIG common field in each content channel may use multiple encoded blocks to encode different subfields, and each encode block has at most 64 information bits before encoding (such as 54 signaling bits, 4-bit CRC and 6-bit tail). For example, for PPDU bandwidth of 160 MHz and 320 MHz, the EHT-SIG common field may use 2 encoded blocks. The EHT-SIG user specific field in each content channel uses one encoded block to encode every two user fields, until the last encoded block may have only one user field, or two user fields.

In another option, in the punctured non-OFDMA compression mode (for SU and MU-MIMO transmission) and unpunctured non-OFDMA compression mode (for SU and MU-MIMO transmission), or the (punctured and unpunctured) non-OFDMA compression mode (for SU and MU-MIMO transmission), or the (punctured and unpunctured) SU compression mode (for SU transmission) and the (punctured and unpunctured) non-OFDMA MU-MIMO compression mode (for MU-MIMO transmission), the EHT-SIG common field and the first user field in the User Specific field in one content channel are jointly encoded into one encoded block; for the remaining user fields in the content channel, use one encoded block to encode every two user fields, until the last encoded block may have only one user field, or two user fields. In the uncompressed mode (for OFDMA transmission), if the PPDU bandwidth is 20 MHz, 40 MHz, or 80 MHz, the EHT-SIG common field in each content channel may use one encoded block to encode all subfields; if the PPDU bandwidth is 160 MHz and above (such as 240 MHz, 320 MHz, 480 MHz, 640 MHz, among other examples), the EHT-SIG common field in each content channel may use multiple encoded blocks to encode different subfields, and each encode block has at most 64 information bits before encoding (such as at most 54 signaling bits, 4-bit CRC and 6-bit tail). For example, for PPDU bandwidth of 160 MHz and 320 MHz, the EHT-SIG common field may use 2 encoded blocks. In the uncompressed mode (for OFDMA transmission), the EHT-SIG user specific field in each content channel uses one encoded block to encode every two user fields, until the last encoded block may have only one user field, or two user fields.

Figure 13:
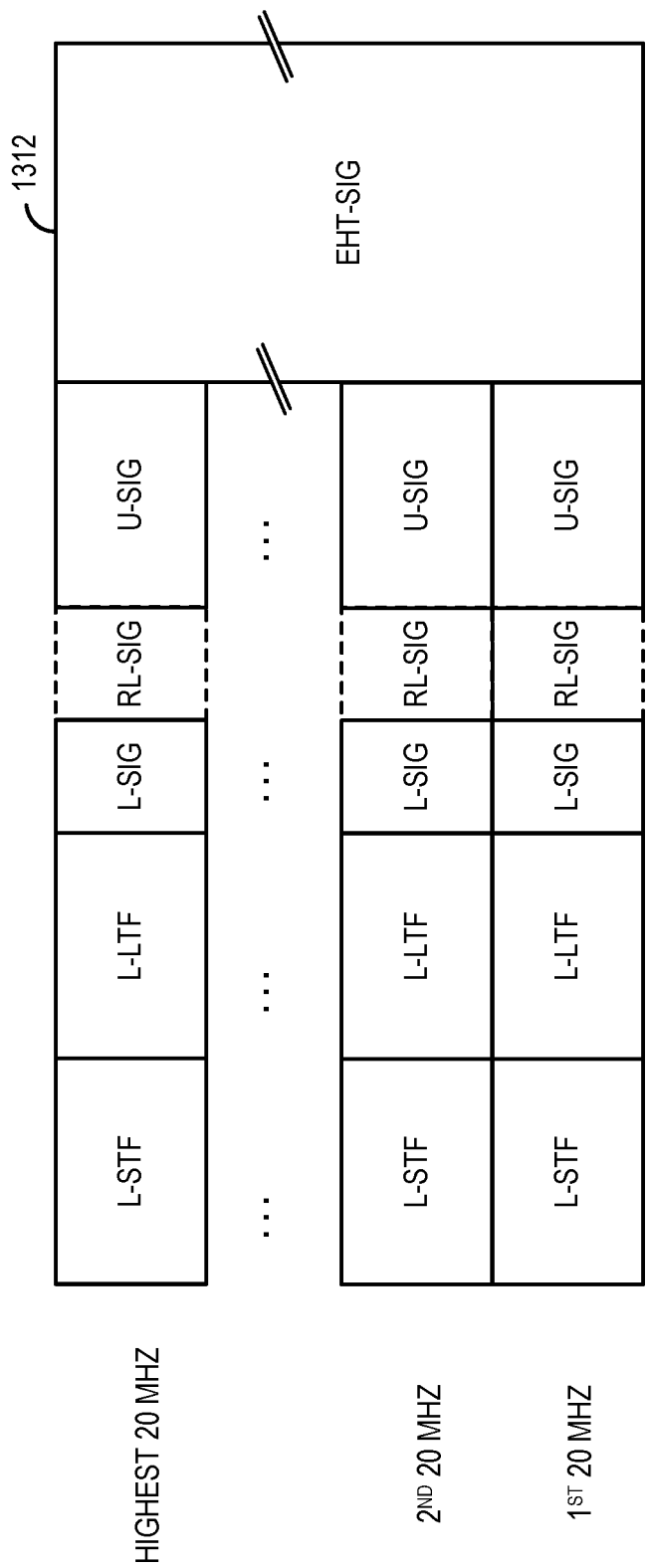
FIG. 13 shows an example frame structure in which a U-SIG is followed by an EHT-SIG field according to some implementations.

FIG. 13 shows an example frame structure in which a U-SIG is followed by an EHT-SIG field 1312 according to some implementations. In some implementations, the U-SIG may be duplicated every 20 MHz subchannel followed by the EHT-SIG 1312. In some other implementations, the U-SIG may has same field structure in all 20 MHz subchannels, but the values of some fields are different every 80 MHz or 160 MHz subband and specific to that 80 MHz or 160 MHz subband. For example, the U-SIG is duplicated for every 20 MHz subchannel within each 80 MHz or 160 MHz subband. Thus, the U-SIG may contain different signaling information for different subbands. In some implementations, the EHT-SIG 1312 may contain different signaling information for each 80 MHz bandwidth portion of the wireless channel. In some implementations, the content of the EHT-SIG may be based on a per-80 MHz bandwidth basis or for the total bandwidth of the wireless channel. In some implementations, the content of the EHT-SIG may be based on which devices are parked on an 80 MHz bandwidth portion and may support signaling of RU allocations for other 80 MHz bandwidth portions.

Figure 14:
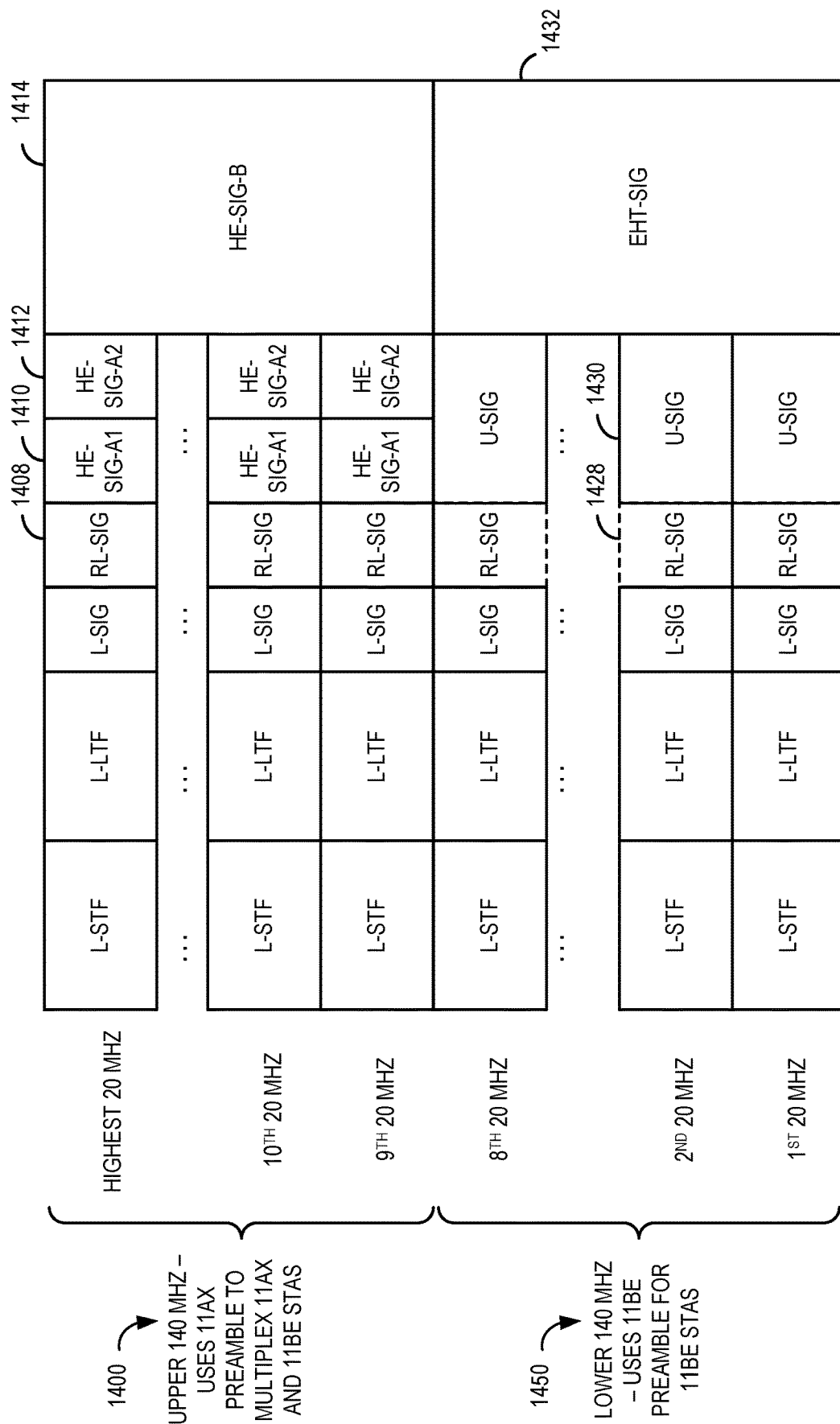
FIG. 14 shows an example frame structure in which different types of signal fields follow the RL-SIG on different subchannels according to some implementations.

FIG. 14 shows an example frame structure in which different types of signal fields follow the RL-SIG on different subchannels according to some implementations. For example, an upper subband 1400 of the total channel bandwidth (such as 320 MHz) may be used for 11ax transmissions while a lower subband 1450 of the total channel bandwidth may be used for 11be transmissions. This may be referred to as mixed mode transmission because it may include a mix of communication protocols in a same packet. Following the RL-SIG 1408, the upper subband 1400 may include HE-SIG-A1 1410, HE-SIG-A2 1412 and HE-SIG-B 1414. The HE-SIG-B 1414 may span multiple 20 MHz subchannels that make up the upper subband 1400. Meanwhile, in the lower subband 1450, the RL-SIG 1428 may be followed by the U-SIG 1430 and the EHT-SIG 1432. The EHT-SIG 1432 may span multiple 20 MHz subchannels that make up the lower subband 1450. The examples of which type of transmission is included in the upper and lower subbands are intended as an illustrative example, but other sizes of subbands and other types of protocol signaling may be used for other examples.

Thus, according to this technique, flax STAs can be multiplexed in an 80 MHz or 160 MHz subband (using flax preamble), while 11be STAs can be multiplexed in the rest of channel bandwidth (using 11be preamble). In some implementations, the signal fields (such as HE-SIG-B and EHT-SIG) may end at the same symbol boundary even though the other signal fields in the second portion of the preamble may have different sizes (as shown in FIG. 14). The signal fields may end at same time for all subchannels and all subbands, such that the next symbol after RL-SIG to end of SIG-B have the same number of OFDM SIG symbols (4 μs each) for all subchannels and all subbands. Following the SIGs, there may be other fields (such as an EHT short training field (EHT-STF), an EHT long training field (EHT-LTF), and data) following the end of the SIG. Thus, the EHT-STF and the EHT-LTF are aligned in time for all subchannels and all subbands.

In some implementations, the HE-Data of the subchannels starting with flax preamble and the EHT-Data of the subchannels starting with 11be preamble do not need to end at same time. Furthermore, the L_LENGTH value in L-SIG for the subchannels starting with 11ax preamble and that for the subchannels starting with 11be preamble do not need to be the same. And TXOP value in the HE-SIG-A in the flax preamble and the EHT-SIG-A in the 11be preamble do not need to be the same. 11ax devices are in flax mode, while 11be devices parked in the subband starting with flax preamble will be in flax mode, using 1 RU each. When a device is parked in the subband, the device processes the 20 MHz legacy preamble signal within that subband, and then moves on to process possibly wider bandwidth or other subbands if signaling (such as PPDU BW indication and punctured channel indication) indicates that the device should process signaling in other subbands. 11be devices parked in the subband starting with 11be preamble will be in 11be mode, and may utilize multiple RUs, including RUs in the subband starting with flax preamble.

In addition to the formats of the signal fields described in the previous figures, this disclosure includes various types of information that may be included in the signal fields. For example, punctured channel information may be indicated in one or more signal fields.

Punctured Channel Indicators

In some implementations, punctured channel information may be indicated in a PPDU bandwidth (BW) field. The punctured channel information may indicate which channels in the total bandwidth (such as 160 MHz or 320 MHz) are punctured, as well as the puncturing mode, such that the receiving STA knows which channels to process for information (such as the content channel information that will be described further herein) and which channels are punctured and thus not available or otherwise not including information for processing by the STA. In some implementations, the PPDU BW field may be included in the U-SIG field. In some other implementations, the PPDU BW field may be included in the EHT-SIG-A field. The PPDU BW field may be a 4-bit or a 5-bit field for indicating the punctured channels and the puncturing mode. In some implementations, the PPDU BW field also may indicate which EHT-SIG content channel to demodulate.

In some implementations, for a 4-bit PPDU BW field, a PPDU BW field value of 0 may indicate 20 MHz channel bandwidth (and no preamble puncturing). A PPDU BW field value of 1 may indicate 40 MHz channel bandwidth (and no preamble puncturing). A PPDU BW field value of 2 may indicate 80 MHz channel bandwidth (and no preamble puncturing). A PPDU BW field value of 3 may indicate 160 MHz channel bandwidth or 80+80 MHz subband bandwidths (and no preamble puncturing). A PPDU BW field value of 4 may indicate 320 MHz channel bandwidth or 160+160 MHz subband bandwidths (and no preamble puncturing). A PPDU BW field value of 5 may indicate 80 MHz channel bandwidth and that only the secondary 20 MHz subchannel is punctured. A PPDU BW field value of 6 may indicate 80 MHz channel bandwidth and that the primary 40 MHz subchannel is not punctured. A PPDU BW field value of 7 may indicate 160 MHZ channel bandwidth or 80+80 MHz subband bandwidths and that only the secondary 20 MHz subchannel is punctured in the primary 80 MHz subband. A PPDU BW field value of 8 may indicate 160 MHz channel bandwidth or 80+80 MHz subband bandwidths and that the primary 40 MHz subchannel is not punctured in the primary 80 MHz subband. A PPDU BW field value of 9 may indicate 320 MHz channel bandwidth or 160+160 MHz subband bandwidths and that only the secondary 20 MHz subchannel is punctured in the primary 80 MHz subband. A PPDU BW field value of 10 may indicate 320 MHz channel bandwidth or 160+160 MHz subband bandwidths and that the primary 40 MHz subchannel is not punctured in the primary 80 MHz subband.

In some implementations, for a 5-bit PPDU BW field, a PPDU BW field value of 0 may indicate 20 MHz channel bandwidth (and no preamble puncturing). A PPDU BW field value of 1 may indicate 40 MHz channel bandwidth (and no preamble puncturing). A PPDU BW field value of 2 may indicate 80 MHz channel bandwidth (and no preamble puncturing). A PPDU BW field value of 3 may indicate 160 MHz channel bandwidth or 80+80 MHz subband bandwidths (and no preamble puncturing). A PPDU BW field value of 4 may indicate 320 MHz channel bandwidth or 160+160 MHz subband bandwidths (and no preamble puncturing). A PPDU BW field value of 5 may indicate 80 MHz channel bandwidth and that only the secondary 20 MHz subchannel is punctured. A PPDU BW field value of 6 may indicate 80 MHz channel bandwidth and that the primary 40 MHz subchannel is not punctured. A PPDU BW field value of 7 may indicate 160 MHz channel bandwidth or 80+80 MHz subband bandwidths and that only the secondary 20 MHz subchannel is punctured in the primary 80 MHz subband. A PPDU BW field value of 8 may indicate 160 MHz channel bandwidth or 80+80 MHz subband bandwidths and that the primary 40 MHz subchannel is not punctured in the primary 80 MHz subband. A PPDU BW field value of 9 may indicate 320 MHz channel bandwidth or 160+160 MHz subband bandwidths and that only the secondary 20 MHz subchannel is punctured in the primary 80 MHz subband. A PPDU BW field value of 10 may indicate 320 MHz channel bandwidth or 160+160 MHz subband bandwidths and that the primary 40 MHz subchannel is not punctured in the primary 80 MHz subband. A PPDU BW field value of 11 may indicate 80 MHz channel bandwidth and that only the primary 40 MHz subchannel is punctured (secondary 20 MHz subchannel is punctured). A PPDU BW field value of 12 may indicate 80 MHz channel bandwidth and that the secondary 20 MHz subchannel and tertiary 20 MHz subchannel are not punctured, but the primary 20 MHz subchannel is punctured (secondary 20 MHz subchannel is not punctured). A PPDU BW field value of 13 may indicate 160 MHz channel bandwidth or 80+80 MHz subband bandwidths and that only the primary 40 MHz subchannel is punctured in the primary 80 MHz subband. A PPDU BW field value of 14 may indicate 160 MHz channel bandwidth or 80+80 MHz subband bandwidths and that the secondary 20 MHz subchannel and tertiary 20 MHz subchannel are not punctured, but the primary 20 MHz subchannel is punctured. A PPDU BW field value of 15 may indicate 320 MHz channel bandwidth and that only the primary 40 MHz subchannel is punctured in the primary 80 MHz subband. A PPDU BW field value of 16 may indicate 320 MHz channel bandwidth and that the secondary 20 MHz subchannel and tertiary 20 MHz subchannel are not punctured, but the primary 20 MHz subchannel is punctured.

In some implementations, instead of the PPDU BW field, a punctured channel bitmap may be used to indicate the punctured subchannels and the puncturing mode. In some implementations, the punctured channel bitmap may be included in an N-bit field of the U-SIG. In some implementations, the punctured channel bitmap may be included in an N-bit field of the EHT-SIG. In some implementations, the number of bits (N) of the N-bit field may be based on the total bandwidth and the puncturing granularity (B), where the product of N and B equals the total bandwidth. For example, if the total bandwidth is 320 MHz, and the granularity is 20 MHz, then 16 bits will be used (N=16). Thus, every 80 MHz or 160 MHz subband may have the 16-bit field to indicate a punctured channel bitmap. In some implementations, the puncturing granularity (B) may be signaled using one bit, in order to indicate either a 20 MHz or a 40 MHz granularity. In some implementations, the PPDU BW field value may indicate the puncturing granularity (B) without additional signaling.

In some implementations, the N-bit field with the punctured channel bitmap is not duplicated for each subband (such as the 80 MHz or 160 MHz subbands), and instead each subband may include a different N-bit field with its own punctured channel bitmap. In some implementations, for each subband, the number of bits (N) of the N-bit field may be based on the subband bandwidth and the puncturing granularity (B), where the product of N and B equals the subband bandwidth. For example, if the subband bandwidth is 80 MHz, and the granularity is 20 MHz, then 4 bits will be used (N=4). If the subband bandwidth is 160 MHz, and the granularity is 20 MHz, then 8 bits will be used (N=8). In some implementations, an intended receiving STA may look at all of the 80 MHz or 160 MHz subbands for the pertinent punctured channel bitmaps due to parallelization.

Multi-AP Transmissions and Beamforming

In some implementations, signaling for multi-AP coordinated beamforming (CBF) and joint transmission may be included. In some implementations, sounding and feedback may be provided in advance for both signaling for multi-AP CBF and for joint transmission. In some implementations, multi-AP CBF may form nulls to unintended receivers via precoding. Each CBF PPDU may act like a single BSS PPDU without OBSS interference. The beamformed portion of the PPDU may be protected by nulling of OBSS interference. In some implementations, beamforming may be performed from the beginning of the packet (including the legacy portion of preamble), and the beam change bit may be set to zero to indicate the beamforming was performed from the beginning of packet. When the beam change bit is set to one, then it indicates the legacy portion and the non-legacy portion are using different beams and different beamforming. In some implementations, in 11be, the beam change bit may be included in the U-SIG or in the EHT-SIG. In some implementations, Multi-AP joint transmission uses beamforming from multiple APs to intended receivers. The Multi-AP JT sequence may be triggered-based and makes sure all participating APs and STAs (in responding packets) are synchronized in time, frequency, and phase. Each JT PPDU may use a triggered PPDU, where a lot of signaling information is known from trigger. The beamformed portion of the PPDU may have JT gain benefits. A special BSS color may be assigned to the JT sequence so that all participating APs use this BSS color. In some implementations, beamforming may be performed from the beginning of the packet (including the legacy part), and there may not be a beam change bit in the signaling.

Figure 15:
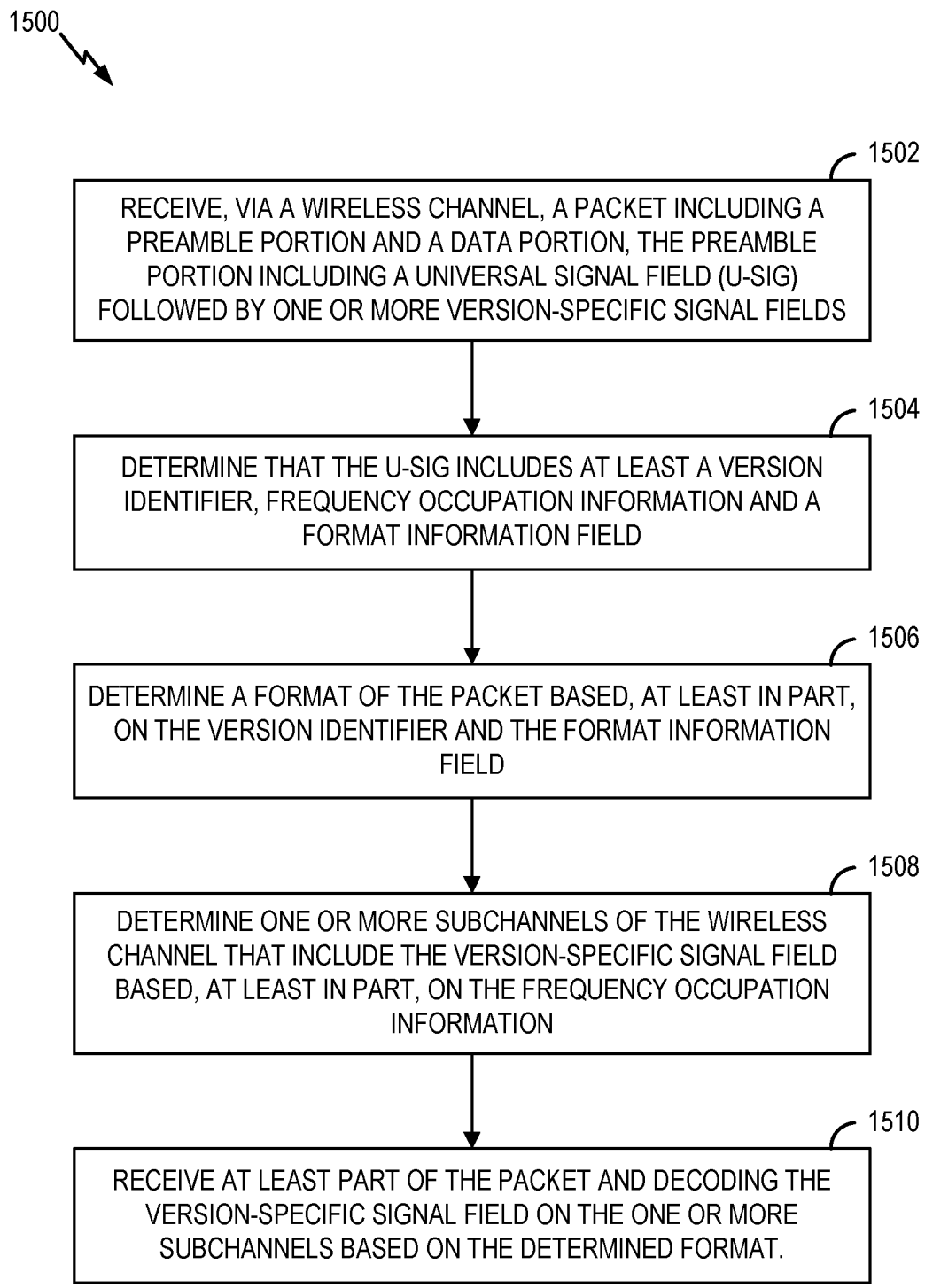
FIG. 15 shows a flowchart illustrating an example process for receiving a wireless communication according to some implementations.

FIG. 15 shows a flowchart illustrating an example process 1500 for receiving a wireless communication according to some implementations. The process 1500 may be performed by a wireless communication device such as the wireless communication device 800 described above with reference to FIG. 8. In some implementations, the process 1500 may be performed by a wireless communication device operating as or within an AP, such as one of the APs 102 and 902 described above with reference to FIGS. 1 and 9A, respectively. In some implementations, the process 1500 may be performed by a wireless communication device operating as or within a STA, such as one of the STAs 104 and 904 described above with reference to FIGS. 1 and 9B, respectively.

In some implementations, the process 1500 begins in block 1502 with receiving, via a wireless channel, a packet including a preamble portion and a data portion. The preamble portion includes a universal signal field (U-SIG) followed by one or more version-specific signal fields.

In block 1504, the process 1500 proceeds with determining that the U-SIG includes at least a version identifier, frequency occupation information and a format information field.

In block 1506, the process 1500 proceeds with determining a format of the packet based, at least in part, on the version identifier and the format information field.

In block 1508, the process 1500 proceeds with determining one or more subchannels of the wireless channel that include the version-specific signal field based, at least in part, on the frequency occupation information.

In block 1510, the process 1500 proceeds with receiving at least part of the packet and decoding the version-specific signal field on the one or more subchannels based on the determined format.

Figure 16:
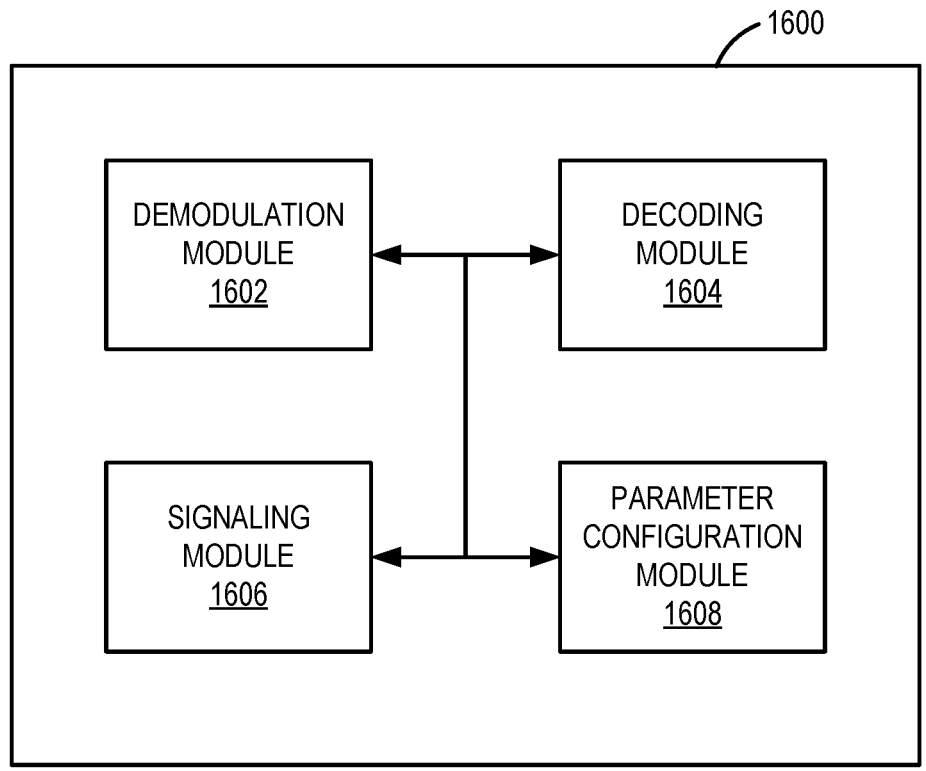
FIG. 16 shows a block diagram of an example wireless communication device according to some implementations.

FIG. 16 shows a block diagram of an example wireless communication device 1600 according to some implementations. In some implementations, the wireless communication device 1600 is configured to perform one or more of the processes described herein. The wireless communication device 1600 may be an example implementation of the wireless communication device 800 described above with reference to FIG. 8. For example, the wireless communication device 1600 can be a chip, SoC, chipset, package or device that includes at least one processor and at least one modem (for example, a Wi-Fi (IEEE 802.11) modem or a cellular modem). In some implementations, the wireless communication device 1600 can be a device for use in an AP, such as one of the APs 102 and 902 described above with reference to FIGS. 1 and 9A, respectively. In some implementations, the wireless communication device 1600 can be a device for use in a STA, such as one of the STAs 104 and 904 described above with reference to FIGS. 1 and 9B, respectively. In some other implementations, the wireless communication device 1600 can be an AP or a STA that includes such a chip, SoC, chipset, package or device as well as at least one transmitter, at least one receiver, and at least one antenna.

The wireless communication device 1600 includes a demodulation module 1602, a decoding module 1604, a signaling module 1606 and a parameter configuration module 1608. Portions of one or more of the modules 1602, 1604, 1606 and 1608 may be implemented at least in part in hardware or firmware. For example, the demodulation module 1602, the decoding module 1604, the signaling module 1606 and the parameter configuration module 1608 may be implemented at least in part by a modem (such as the modem 802). In some implementations, portions of some of the modules 1602, 1604, 1606 or 1608 may be implemented at least in part as software stored in a memory (such as the memory 808). For example, portions of one or more of the modules 1602, 1604, 1606 or 1608 can be implemented as non-transitory instructions (or "code") executable by a processor (such as the processor 806) to perform the functions or operations of the respective module.

The demodulation module 1602 is configured to receive a packet including a physical layer preamble that includes a first portion and a second portion following the first portion. The packet may further include a payload after the preamble. The demodulation module 1602 is configured to demodulate the symbols in the received packet and to determine the modulation scheme that was used to module the symbols. In some implementations, the packet may be an example of the PPDU 1000 described with reference to FIG. 10. As described above, in such implementations, the first portion includes a first signal field (L-SIG) and the second portion includes a repeat of L-SIG (RL-SIG) that immediately follows L-SIG. In some implementations, RL-SIG may be masked with a masking sequence and the demodulation module 1602 is further configured to unmask RL-SIG before demodulating it. The second portion further includes at least one additional signal field after RL-SIG. For example, the second portion of the preamble may include a new signal field (U-SIG), such as U-SIG 1016. The second portion may further include additional third signal fields such as EHT-SIG.

The decoding module 1604 is configured to decode the bits in the demodulated symbols and to interpret bits in the decoded bits based on a WLAN communication protocol.

The signaling module 1606 is configured to interpret signal fields of the packet in accordance with the implementations described above. For example, the signaling module 1606 may interpret signal fields using parallelization for different subbands or different subchannels of the wireless channel. The signaling module 1606 may interpret signaling regarding different content channels that follow the RL-SIG or the U-SIG. The signaling module 1606 may interpret an EHT-SIG based on a format information field in the U-SIG.

The parameter configuration module 1608 is configured to set, based on at least one interpreted bit received from the decoding module 1604, at least one reception parameter for the packet. For example, the parameter configuration module 1608 may set parameters including one or more of a channel bandwidth parameter, a spatial stream setting, and a modulation order for receiving the packet.

Figure 17:
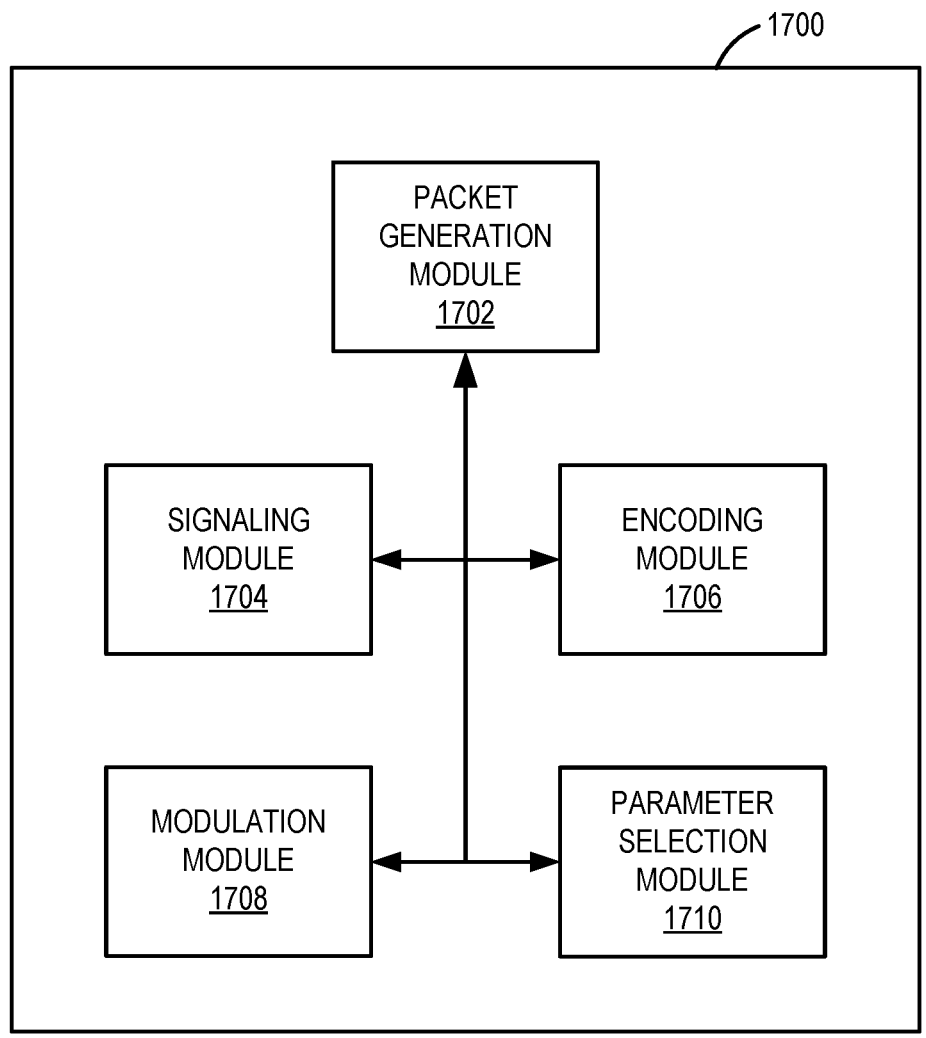
FIG. 17 shows a block diagram of an example wireless communication device according to some implementations.

FIG. 17 shows a block diagram of an example wireless communication device 1700 according to some implementations. In some implementations, the wireless communication device 1700 is configured to perform one or more of the processes described herein. The wireless communication device 1700 may be an example implementation of the wireless communication device 800 described above with reference to FIG. 8. For example, the wireless communication device 1700 can be a chip, SoC, chipset, package or device that includes at least one processor and at least one modem (for example, a Wi-Fi (IEEE 802.11) modem or a cellular modem). In some implementations, the wireless communication device 1700 can be a device for use in an AP, such as one of the APs 102 and 902 described above with reference to FIGS. 1 and 9A, respectively. In some implementations, the wireless communication device 1700 can be a device for use in a STA, such as one of the STAs 104 and 904 described above with reference to FIGS. 1 and 9B, respectively. In some other implementations, the wireless communication device 1700 can be an AP or a STA that includes such a chip, SoC, chipset, package or device as well as at least one transmitter, at least one receiver, and at least one antenna.

The wireless communication device 1700 includes a packet generation module 1702, a signaling module 1704, an encoding module 1706, a modulation module 1708 and a parameter selection module 1710. Portions of one or more of the modules 1702, 1704, 1706, 1708 and 1710 may be implemented at least in part in hardware or firmware. For example, the packet generation module 1702, the signaling module 1704, the encoding module 1706, the modulation module 1708 and the parameter selection module 1710 may be implemented at least in part by a modem (such as the modem 802). In some implementations, portions of some of the modules 1702, 1704, 1706, 1708 or 1710 may be implemented at least in part as software stored in a memory (such as the memory 808). For example, portions of one or more of the modules 1702, 1704, 1706 or 1708 can be implemented as non-transitory instructions (or "code") executable by a processor (such as the processor 806) to perform the functions or operations of the respective module.

The packet generation module 1702 is configured to generate a packet including a physical layer preamble that includes a first portion and a second portion following the first portion. The packet may further include a payload after the preamble. In some implementations, the packet may be an example of the PPDU 1000 described with reference to FIG. 10. As described above, in such implementations, the first portion includes a first signal field (L-SIG) and the second portion includes a repeat of L-SIG (RL-SIG) that immediately follows L-SIG. In some implementations, the packet generation module 1702 may be configured to mask RL-SIG with a masking sequence. The second portion further includes at least one additional signal field after RL-SIG. For example, the second portion of the preamble may include a new signal field (U-SIG), such as U-SIG 1016. The second portion may further include additional third signal field such as the EHT-SIG).

The signaling module 1704 is configured to prepare signal fields for the packet in accordance with the implementations described above. For example, the signaling module 1704 may prepare signal fields using parallelization for different subbands or different subchannels of the wireless channel. The signaling module 1704 may determine and prepare signaling regarding different content channels that follow the RL-SIG or the U-SIG.

The modulation module 1708 is configured to modulate the symbols in the generated packet. The parameter selection module 1710 is configured to select at least one transmit parameter for the packet. For example, the parameter selection module 1710 may set parameters including one or more of a channel bandwidth, a spatial stream setting, and a modulation order for transmitting the packet.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device comprising:
   receiving, via a wireless channel, a packet including a preamble portion and a data portion, the preamble portion including:
      a universal signal field (U-SIG) that includes one or more fields that provide format information; and
      one or more version-specific signal fields including a common field having a format, indicated by the format information, usable for single-user (SU) communications and usable for multi-user (MU) communications and at least one user block field that provides information for at least one user to decode the data portion; and
   decoding the one or more version-specific signal fields in accordance with the U-SIG and the format information.

2. The method of claim 1, wherein:
   the common field indicates a resource allocation for a single user in accordance with an indication of preamble puncturing associated with the preamble portion of a SU communication,
   the common field indicates one or more resource allocations in accordance with an MU communication, or
   the common field does not indicate any resource allocations in accordance with an absence of the indication of preamble puncturing of the SU communication.

3. The method of claim 1, wherein the one or more version-specific signal fields include a first signal field that includes the common field, the first signal field having:
   a compressed format associated with the packet being directed to a single user, and
   an uncompressed format associated with the packet being directed to multiple users.

4. The method of claim 3, wherein, associated with the first signal field having the compressed format, the one or more version-specific signal fields include only one user block field.

5. The method of claim 3, wherein, associated with the first signal field having the uncompressed format, the one or more version-specific signal fields include one or more user block fields.

6. The method of claim 1, wherein the common field, associated with the packet being directed to multiple users, includes two or more resource unit (RU) allocations respectively associated with two or more users, and the common field, associated with the packet being directed to a single user, does not include an RU allocation.

7. The method of claim 1, wherein the one or more version-specific signal fields are transmitted according to an adjustable modulation and coding scheme (MCS) that is indicated by the U-SIG.

8. The method of claim 7, wherein the one or more version-specific signal fields have a collective length of one or more symbols that is indicated by the U-SIG.

9. The method of claim 1, wherein the one or more version-specific signal fields further include one or more additional signal fields, the one or more additional signal fields including one or more of a a beamformed indicator, a spatial reuse indicator, a guard interval (GI) and long training field (LTF) indicator, a number of LTF symbols indicator, a low-density parity check (LDPC) extra symbol segment indicator, a pre-forward error correction (pre-FEC) padding factor indicator, packet extension (PE) disambiguity indicator, or a beam change indicator.

10. A wireless communication device comprising:
at least one modem configured to communicate via a wireless channel;
at least one processor communicatively coupled with the at least one modem; and
at least one memory communicatively coupled with the at least one processor and storing processor-readable code that, when executed by the at least one processor in conjunction with the at least one modem, is configured to:
obtain, via the at least one modem, a packet including a preamble portion and a data portion, the preamble portion including:
a universal signal field (U-SIG) that includes one or more fields that provide format information; and
one or more version-specific signal fields including a common field having a format, indicated by the format information, usable for single-user (SU) communications and usable for multi-user (MU) communications and at least one user block field that provides information for at least one user to decode the data portion; and
decode the one or more version-specific signal fields in accordance with the U-SIG and the format information.

11. The wireless communication device of claim 10, wherein:
the common field indicates a resource allocation for a single user in accordance with an indication of preamble puncturing associated with the preamble portion of a SU communication,
the common field indicates one or more resource allocations in accordance with an MU communication, or
the common field does not indicate any resource allocations in accordance with an absence of the indication of preamble puncturing of the SU communication.

12. The wireless communication device of claim 10, wherein the one or more version-specific signal fields include a first signal field that includes the common field, the first signal field having:
a compressed format associated with the packet being directed to a single user, and
an uncompressed format associated with the packet being directed to multiple users.

13. The wireless communication device of claim 12, wherein, associated with the first signal field having the compressed format, the one or more version-specific signal fields include only one user block field.

14. The wireless communication device of claim 12, wherein, associated with the first signal field having the uncompressed format, the one or more version-specific signal fields includes one or more user block fields.

15. The wireless communication device of claim 10, wherein the common field, associated with the packet being directed to multiple users, includes two or more resource unit (RU) allocations respectively associated with two or more users, and the common field, associated with the packet being directed to a single user, does not include an RU allocation.

16. The wireless communication device of claim 10, wherein the one or more version-specific signal fields are transmitted according to an adjustable modulation and coding scheme (MCS) that is indicated by the U-SIG.

17. The wireless communication device of claim 16, wherein the one or more version-specific signal fields have a collective length of one or more symbols that is indicated by the U-SIG.

18. The wireless communication device of claim 10, wherein the one or more version-specific signal fields further include one or more additional signal fields, the one or more additional signal fields including one or more of a a beam-formed indicator, a spatial reuse indicator, a guard interval (GI) and long training field (LTF) indicator, a number of LTF symbols indicator, a low-density parity check (LDPC) extra symbol segment indicator, a pre-forward error correction (pre-FEC) padding factor indicator, packet extension (PE) disambiguity indicator, or a beam change indicator.

19. A mobile station comprising:
a wireless communication device comprising:
at least one modem configured to communicate via a wireless channel;
at least one processor communicatively coupled with the at least one modem;
at least one memory communicatively coupled with the at least one processor and storing processor-readable code that, when executed by the at least one processor in conjunction with the at least one modem, is configured to:
obtain, via the at least one modem, a packet including a preamble portion and a data portion, the preamble portion including:
a universal signal field (U-SIG) that includes one or more fields that provide format information; and
one or more version-specific signal fields including a common field having a format, indicated by the format information, usable for single-user (SU) communications and usable for multi-user (MU) communications for at least one user block field that provides information for at least one user to decode the data portion; and
decode the one or more version-specific signal fields in accordance with the U-SIG and the format information;
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one memory, the at least one transceiver and at least a portion of the at least one antenna.

* * * * *